United States Patent
Pouli et al.

(10) Patent No.: US 10,467,735 B2
(45) Date of Patent: Nov. 5, 2019

(54) INVERSE TONE MAPPING BASED ON LUMINANCE ZONES

(71) Applicant: THOMSON Licensing, Issy-les-Moulineaux (FR)

(72) Inventors: Tania Pouli, Le Rheu (FR); Laurent Cauvin, Chevaigné (FR); Jonathan Kervec, Paimpont (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 63 days.

(21) Appl. No.: 15/755,052

(22) PCT Filed: Aug. 25, 2016

(86) PCT No.: PCT/EP2016/070056
§ 371 (c)(1),
(2) Date: Feb. 23, 2018

(87) PCT Pub. No.: WO2017/032822
PCT Pub. Date: Mar. 2, 2017

(65) Prior Publication Data
US 2018/0247396 A1    Aug. 30, 2018

(30) Foreign Application Priority Data
Aug. 25, 2015    (EP) .................................. 15306313.6

(51) Int. Cl.
*G06T 5/00* (2006.01)
*G06T 7/90* (2017.01)

(52) U.S. Cl.
CPC .............. *G06T 5/009* (2013.01); *G06T 5/008* (2013.01); *G06T 7/90* (2017.01);
(Continued)

(58) Field of Classification Search
None
See application file for complete search history.

(56) References Cited

U.S. PATENT DOCUMENTS 7,437,013 B2 * 10/2008 Anderson ............... G06T 5/002
358/3.26
8,050,512 B2 * 11/2011 Daly ....................... G06T 5/009
382/254
(Continued)

FOREIGN PATENT DOCUMENTS

| BR | PI0719548 | 1/2014 |
|---|---|---|
| EP | WO2008066840 | 6/2008 |
| WO | WO2015096955 | 7/2015 |
| WO | WO2015123067 | 8/2015 |

OTHER PUBLICATIONS

P. Kuo, C.Tang and S. Chien, "Content-adaptive inverse tone mapping," 2012 Visual Communications (Year: 2012).*
(Continued)

*Primary Examiner* — Andrae S Allison
(74) *Attorney, Agent, or Firm* — Brian J. Dorini; Patricia A. Verlangieri

(57) ABSTRACT

Inverse tone mapping based on luminance zones is provided. A digital image can be obtained and luminance values of pixels of the digital image can be determined. One or more values of luminance zone boundaries can be determined. A zone expansion exponent map based on the luminance values and the one or more luminance zone boundaries can be determined. The one or more luminance zone boundaries divide the zone expansion exponent map into a plurality of luminance zones. The luminance values of the image can be inverse tone mapped based on the zone expansion exponent map. An expanded dynamic range image can be provided based on the inverse tone mapped luminance values.

15 Claims, 14 Drawing Sheets

(52) U.S. Cl.
CPC ............... *G06T 2207/10024* (2013.01); *G06T 2207/10028* (2013.01); *G06T 2207/20208* (2013.01)

(56) References Cited

U.S. PATENT DOCUMENTS

| | | | |
|---|---|---|---|
| 8,208,038 B2 | 6/2012 | Wakagi et al. | |
| 8,314,847 B2 | 11/2012 | Brunner | |
| 9,357,138 B2* | 5/2016 | Nashizawa | H04N 5/2355 |
| 10,127,640 B2* | 11/2018 | Cauvin | G06T 5/002 |
| 2005/0083120 A1 | 4/2005 | Roos et al. | |
| 2005/0094003 A1* | 5/2005 | Thorell | H04N 9/646 |
| | | | 348/241 |
| 2009/0033773 A1* | 2/2009 | Kinoshita | G06T 3/4023 |
| | | | 348/241 |
| 2010/0054622 A1* | 3/2010 | Adams | G06T 3/403 |
| | | | 382/269 |
| 2010/0259650 A1* | 10/2010 | Sasaki | G06K 9/6212 |
| | | | 348/241 |
| 2013/0177066 A1 | 7/2013 | Ye et al. | |
| 2014/0210847 A1 | 7/2014 | Knibbeler et al. | |
| 2016/0328830 A1* | 11/2016 | Pouli | H04N 5/57 |
| 2016/0358319 A1* | 12/2016 | Xu | H04N 1/4072 |
| 2017/0337670 A1* | 11/2017 | Guermoud | G06K 9/4661 |

OTHER PUBLICATIONS

Banterle, Francesco, et al. "High dynamic range imaging and low dynamic range expansion for generating HDR content." Computer graphics forum. vol. 28. No. 8. Oxford, UK: Blackwell Publishing Ltd, 2009. (Year: 2009).*

Huo et al, Inverse Tone Mapping Based upon Retina Response, Hindawi Publishing Corporation e Scientific World Journal vol. 2014, Article ID 168564, 5 pages http://dx.doi.org/10.1155/2014/168564 (Year: 2014).*

Banterle F et al: "Inverse tone mapping", Proceedings of the 4th International Conference on Computer Graphics and Interactive Techniques in Australasia and Southeast Asia, ACM, New York, NY, US, Nov. 29, 2006 (Nov. 29, 2006), pp. 333-341, XP009151242, ISBN: 978-1-59593-564-9, (Year: 2006).*

Banterle, Francesco, Alan Chalmers, and Roberto Scopigno. "Real-Time High Fidelity Inverse Tone Mapping for Low Dynamic Range Content." Eurographics (Short Papers). 2013. (Year: 2013).*

Pouli et al., "Scene Adaptative Inverse Tone Mapping for LDR to HDR conversion", European Patent Application, Dec. 27, 2013, pp. 1-9. (Year: 2013).*

Meylan, L.: 'Tone mapping for high dynamic range images', 2006, PhD, EPFL, Lausanne, No. 3588. (Year: 2006).*

Shi et al., "A Novel Image Enhancement Method Using Local Gamma Correction with Three-level Thresholding", 2011 6th IEEE Joint International Information Technology and Artificial Intelligence Conference (ITAIC), Chongqing, China, Aug. 20, 2011, pp. 374-378.

Kuo et al., "Content-Adaptive Inverse Tone Mapping", 2012 IEEE Visual Communications and Image Processing (VCIP), San Diego, California, USA, Nov. 27, 2012, pp. 1-6.

Banterle et al., "A Framework for Inverse Tone Mapping", The Visual Computer, vol. 23, No. 7, May 24, 2007, pp. 467-478.

* cited by examiner

INVERSE TONE MAPPING BASED ON LUMINANCE ZONES

This application claims the benefit of International Application PCT/EP2016/070056, under 35 U.S.C. § 365, filed on Aug. 25, 2016, which was published in accordance with Article 21(2) on Mar. 2, 2017, in English, and which claims the benefit of European Patent Application No. 15306313.6, filed on Aug. 25, 2015.

TECHNICAL FIELD

The disclosure relates to the field of high dynamic range imaging, and in particular, to expanding dynamic range based on luminance zones.

BACKGROUND

Recent advancements in display technology are beginning to allow for an extended range of color, luminance and contrast to be displayed. High dynamic range (HDR) technologies focus on capturing, processing and displaying content of a wider dynamic range. Although a number of HDR display devices have appeared, and image cameras capable of capturing images with an increased dynamic range are being developed, there is still very limited HDR content available. While recent developments promise native capture of HDR content in the near future, they do not address existing, low dynamic range (LDR) content.

SUMMARY

Inverse tone mapping based on luminance zones is disclosed. A digital image can be obtained and luminance values of pixels of the digital image can be determined. One or more values of luminance zone boundaries can be determined. A zone expansion exponent map based on the luminance values and the one or more luminance zone boundaries can be determined. The one or more luminance zone boundaries divide the zone expansion exponent map into a plurality of luminance zones. The luminance values of the image can be inverse tone mapped based on the luminance zones to which these luminance values belong. An expanded dynamic range image can be provided based on the inverse tone mapped luminance values.

More precisely, a subject of the invention is a method for providing an expanded dynamic range image from a digital image defined by pixels associated with colors represented in a color space separating luminance (Y) from chrominance, comprising:

determining (103) a plurality of luminance zones in which luminance values representing said colors of pixels are distributed;

inverse tone mapping (105) each of said luminance values according to the luminance zone to which said each luminance value belongs; and providing (106) an expanded dynamic range image based on the inverse tone mapped luminance values.

Preferably, this method comprises determining an expansion exponent value for each pixel of said digital image according to the luminance zone to which luminance value of said pixel belongs, wherein inverse tone mapping luminance value of said pixel comprises applying said expansion exponent value to said luminance value. Such an application is illustrated by equation (22) in embodiments below. The determination of these expansion exponent values forms generally an expansion exponent map.

Preferably, this method comprises low-pass filtering said luminance values, wherein determining an expansion exponent value for each pixel of said digital image is performed according to an expansion exponent quadratic function of the low-pass filtered luminance value of said pixel, wherein said quadratic function depends on the luminance zone to which luminance value of said pixel belongs. It means that there are as many different expansion exponent quadratic functions as luminance zones of the plurality.

Preferably, in this method, each of the different expansion exponent quadratic functions are defined by a different set of three parameters a, b, c which are different for each of the plurality of luminance zones.

Preferably, said expansion exponent quadratic functions are defined in relationship with a maximum display luminance for a HDR display device.

Preferably, said expansion exponent quadratic functions are defined in relationship with a minimum expansion exponent point.

Preferably, said plurality of luminance zones comprises at least three luminance zones, a low zone for luminances of low values, a high zone for luminances of high values, and a middle zone for luminances comprised between luminances of low values and luminances of high values.

In a variant, said expansion exponent quadratic functions are defined by the same set of three parameters a', b', c' and by the position of at least five expansion exponent control points such that:

said expansion exponent quadratic function determining expansion exponent values in middle zone passes through the second, third, fourth of these five expansion exponent control points, said expansion exponent quadratic function determining expansion exponent values in low zone passes through the first and second of these five expansion exponent control points, and said expansion exponent quadratic function determining expansion exponent values in high zone passes through the fourth and fifth of these five expansion exponent control points.

It means that the different quadratic functions are shifted one in comparison with another, depending on the positioning of the at least five control points.

Preferably, this method comprises interpolating a global expansion exponent curve from the different expansion exponent quadratic functions using a spline interpolation method.

Preferably, this method comprises determining a contrast value for each pixel (p) of said digital image, wherein inverse tone mapping luminance value Y(p) of said pixel comprises multiplying luminance value obtained by the application of said expansion exponent value by said determined contrast value.

Preferably, determining a contrast value for each pixel is performed according to the luminance zone to which luminance value of said pixel belongs.

Preferably, determining a contrast value for each pixel of said digital image is performed according to a contrast quadratic function of said luminance values which depends on the luminance zone to which luminance value of said pixel belongs, wherein said contrast quadratic functions are defined through at least five contrast control points such that:

said contrast quadratic function determining contrast values in middle zone passes through the second, third, fourth of these five contrast control points, said contrast quadratic function determining contrast values in low zone passes through the first and second of these five contrast control points, and said contrast quadratic function determining contrast values in high zone passes through the fourth and fifth of these five contrast control points, and and said method comprises interpolating a global contrast curve from the different contrast quadratic functions using preferably a spline interpolation method.

Preferably, this method comprises determining a lift value for each pixel of said digital image, wherein inverse tone mapping luminance value of said pixel comprises shifting luminance value obtained by the application of said expansion exponent value by said lift value.

Preferably, determining a lift value for each pixel (p) is performed according to the luminance zone to which luminance value Y(p) of said pixel belongs.

Preferably, determining a lift value for each pixel of said digital image is performed according to a lift quadratic function of said luminance values which depends on the luminance zone to which luminance value Y(p) of said pixel belongs, wherein said lift quadratic functions are defined through at least five lift control points such that:

said lift quadratic function determining lift values in middle zone passes through the second, third, fourth of these five lift control points, said lift quadratic function determining lift values in low zone passes through the first and second of these five lift control points, and said lift quadratic function determining lift values in high zone passes through the fourth and fifth of these five lift control points, and and said method comprises interpolating a global lift curve from the different lift quadratic functions using preferably a spline interpolation method.

A subject of the invention is also an apparatus for providing an expanded dynamic range image from a digital image defined by pixels associated with colors represented in a color space separating luminance from chrominance, comprising a processing unit configured to implement the above method. This processing unit may comprise one or a plurality of processors.

A subject of the invention is also a non-transitory computer-readable medium storing computer-executable instructions executable to perform the above method.

An object of the invention is also a method comprising:
  obtaining a digital image;
  determining luminance values of pixels of the digital image;
  determining one or more values of luminance zone boundaries;
  determining a zone expansion exponent map based on the luminance values and the one or more luminance zone boundaries that divide the zone expansion exponent map into a plurality of luminance zones;
  inverse tone mapping the luminance values based on the zone expansion exponent map; and
  providing an expanded dynamic range image based on the inverse tone mapped luminance values.

Preferably, the one or more luminance zone boundaries divide the zone expansion exponent map into a shadow zone, a midtone zone, and a highlight zone.

Preferably, the method also comprises obtaining a maximum display luminance of a display device, wherein the zone expansion exponent map is based on the maximum display luminance.

Preferably, the zone expansion exponent map is based on a low-pass filtering of the luminance values.

Preferably, the zone expansion exponent map is based on a quadratic function.

Preferably, the quadratic function is defined by coefficients which are different for each of the plurality of luminance zones.

Preferably, the zone expansion exponent map is based on a maximum display luminance.

Preferably, the zone expansion exponent map is based on a minimum expansion exponent point.

An object of the invention is also an apparatus comprising:
  a pre-processor that obtains a digital image and determines luminance values of pixels of the digital image;
  a zone expansion mapper that determines one or more values of luminance zone boundaries and determines a zone expansion exponent map based on the luminance values and the one or more luminance zone boundaries that divide the zone expansion exponent map into a plurality of luminance zones;
  an inverse tone mapper that applies inverse tone mapping to the luminance values based on the zone expansion exponent map; and
  a post-processor (242) that provides an expanded dynamic range image based on the inverse tone mapped luminance values.

BRIEF DESCRIPTION OF THE DRAWINGS

The disclosure will be more clearly understood on reading the description which follows, given by way of non-limiting examples and with reference to the appended figures in which.

DETAILED DESCRIPTION

In various embodiments, inverse tone mapping operators (ITMO) based on luminance zones can be used to expand the dynamic range of content, for example, to prepare LDR content for HDR display devices while allowing for independent adjustment of the expansion in different zones of luminance, for example, a shadow zone, a midtone zone, and a highlight zone. Luminance information of colors in the image content can be processed, for example, with the aim of recovering or recreating the appearance of the original scene. For example, such ITMOs can take a conventional (i.e. LDR) image as input, expand the luminance range of the colors of the image in a global manner, and subsequently process highlights or bright regions locally to enhance the HDR appearance of colors in the image. However, better results may be obtained if the expansion of luminance range is adjusted to better suit different luminance zones.

Figure 1:
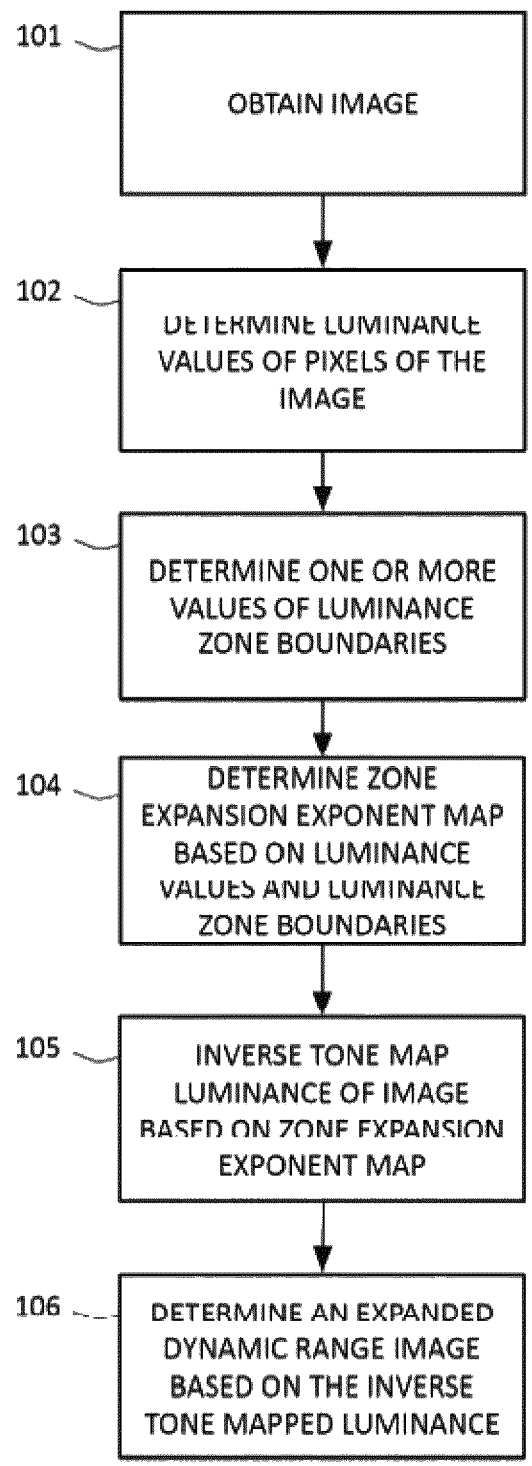
FIG. 1 is a flowchart of a method of inverse tone mapping of an image based on luminance zones according to various embodiments.

FIG. 1 is a flowchart of a method of inverse tone mapping of an image based on luminance zones according to various embodiments. A digital image can be obtained (101), for example, from a input device, such as a data storage device, e.g., a hard disk drive, computer memory (random access memory (RAM), read only memory (ROM), etc.), optical drive, etc., an image capture device, e.g., a digital camera, digital video camera, etc. Luminance values of pixels of the image can be determined (102). For example, if the image is encoded in a color opponent space, such as YUV, the luminance component (e.g., Y) can be used. If the image is encoded in a space that does not include a separate luminance component, the luminance values may be obtained through appropriate calculation based on the components of the color space.

A plurality of different luminance zones are determined. Luminance zone boundaries divide the range of luminance values of the image into different zones. As explained below, such a division can allow independent adjustments to luminance expansion in the different luminance zones. Preferably, luminance values are divided into at least three zones, a low zone (e.g., a shadow zone), a middle zone (e.g., a midtone zone), and a high zone (e.g., a highlight zone). The amount of luminance expansion in each of the three zones can be independently adjusted. In this way, for example, the expansion of the dynamic range of an image can be adjusted to account for how different luminance zones of the image respond to the expansion. In various embodiments, the luminance zone boundaries can be automatically selected based on an analysis of the image. In other various embodiments, the luminance zone boundaries can be user-selected.

According to the invention, expansion of each luminance value is performed according to the luminance zone to which this luminance value belongs. Such a luminance expansion can notably be performed by applying an exponent value to the luminance value to expand. In this situation, expansion exponent values are determined for each luminance value to expand. Preferably, an expansion exponent map is determined based on the luminance values, such a determination depending on the luminance zone to which these luminance values belong. Such an expansion can also be performed by applying a scaling and/or an offset parameter to a luminance value that can be already expanded, notably by applying an exponent value as described above.

The zone expansion exponent map can be determined (104) based on the luminance values and the one or more luminance zone boundaries. The zone expansion exponent map can include values that represent exponents to be applied to the luminance values of the image in an inverse tone mapping operation. The luminance values of the image can be inverse tone mapped (105) based on the zone expansion exponent map, and an expanded dynamic range image can be provided (106) based on the inverse tone mapped luminance. In this way, for example, the dynamic range of the luminance of the inverse tone mapped image can be expanded, for example, to convert a low dynamic range image into a high dynamic range image. Because the zone expansion exponent map is based on selected luminance zone boundaries, the appearance of the expanded luminance within the zones of the tone mapped image can be individually adjusted.

Figure 2:
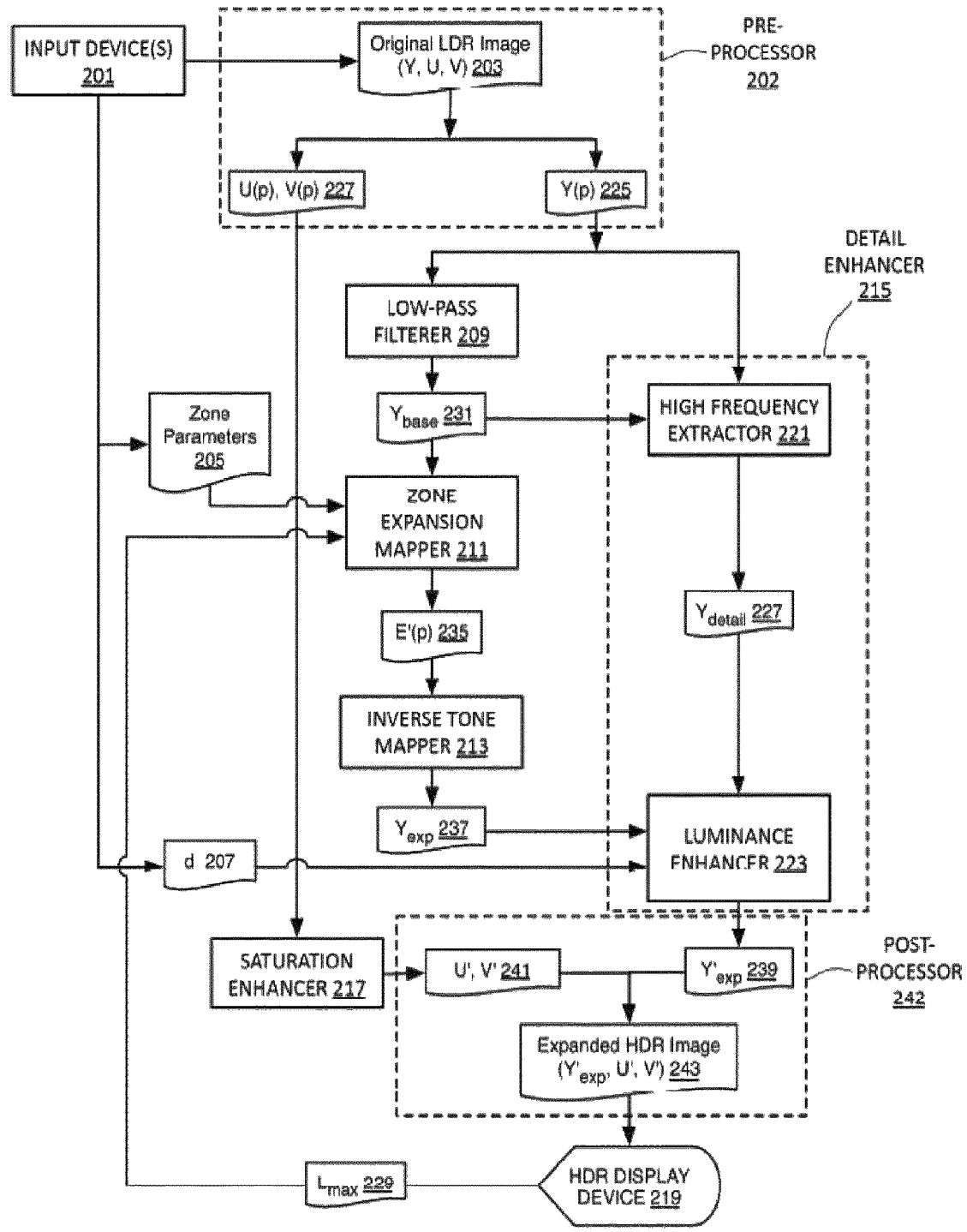
FIG. 2 is a block diagram illustrating an example of a system 200 for inverse tone mapping of an image based on multiple luminance zones according to various embodiments.

FIG. 2 is a block diagram illustrating an example of a system 200 for inverse tone mapping of an image based on multiple luminance zones according to various embodiments.

System 200 can include one or more input devices 201 that can input data, such as an original LDR image 203, zone parameters 205, and a detail parameter (d) 207. One or more input devices 201 can include, for example, a data storage device, such as a hard disk drive, computer memory (RAM, ROM, etc.), optical drive, etc., an image capture device, such as a digital camera, digital video camera, etc., a user input device, such as a computer mouse and graphical user interface (GUI), a touch input device (such as a trackpad, touchscreen, etc.) and touch GUI, etc.

System 200 can also include a low-pass filterer 209, a zone expansion mapper 211, an inverse tone mapper 213, a detail enhancer 215, a saturation enhancer 217 and an HDR display device 219. Detail enhancer 215 can include a high frequency extractor 221 and a luminance enhancer 223.

A pre-processor 202 can obtain original LDR image 203 from one or more input devices 201, and luminance values (Y(p)) 225 can be provided to low-pass filterer 209 and high frequency extractor 221. Chrominance values (U(p) and V(p)) 227 can be provided to saturation enhancer 217. In various embodiments, original LDR image 203 can be in a color opponent space (e.g., YUV, XYZ, Yxy, CIE Lab), which includes luminance as an independent component. In this example, YUV is shown.

In various embodiments, colors of the original LDR image 203 could be represented in a device color space specific to a display device that does not represent luminance as an independent component (e.g., RGB), in which case system 200 can determine luminance values 225 (and color values 227) as one skilled in the art would readily understand. Such a device color space can be standardized, and the corresponding display device can be a virtual one. In such a situation, original LDR image 203 can be processed in a manner known per se such that the color and luminance of the image are represented in a color space separating luminance from chrominance. Thus, in various ways, a luminance value Y(p) and two color values U(p), V(p) can be associated with the color of any pixel, p or i, of original LDR image 203. For instance, RGB values representing colors of the original LDR image 203 in a device color space are converted in a color space having a luminance component Y and for instance two chromatic components, $C_b$ and $C_r$.

Zone expansion mapper 211 can obtain zone expansion parameters 205 from one or more input devices 201 and can obtain a maximum display luminance ($L_{max}$) 229 from HDR display device 219. Although $L_{max}$ 229 is obtained directly from HDR display device 219 in this example, one skilled in the art would readily understand that in various embodiments $L_{max}$ could be obtained, for example, from one or more input devices 201.

Low Pass Filtering of Luminance:

Low-pass filterer 209 can determined a low-pass filtered version of luminance Y(p), referred to herein as a base luminance, $Y_{base}(p)$, shown as 231 in FIG. 2. For example, low-pass filtering can be applied to luminance Y(p) of each pixel, p, of original LDR image 203 based on one or more Gaussian functions in a spatial neighborhood of the pixel p, and in a neighborhood of the luminance value Y(p). For example, $Y_{base}(p)$ can be determined through the following equation:

$$Y_{base}(P)=\Sigma_{i\in\Omega'}Y(p_i)f'_s(\|p_1-p\|)f'_r(\|Y(p_i)-Y(p)\|) \quad (1)$$

where $f'_s$ is first a Gaussian function applied on the spatial domain of the image, where $f'_r$ a second Gaussian function applied on the luminance range domain, where $\Omega'$ is the size of a window of the image centered at the pixel p, and where $p_i$ is a pixel in this window.

In various embodiments, the window size can be for instance 5 or 7. Smaller values of window size may allow for better computational efficiency. In this example, the low-pass filtering is bilateral, which refers to the fact that the filtering is performed here both in spatial and luminance range domains.

In various embodiments, the value of the standard deviation, $\sigma_s$, of the first Gaussian function $f_s$ can be greater than or equal to 2. In various embodiments, the value of the standard deviation, $\sigma_r$, of the second Gaussian function $f_r$ can be high enough to smooth texture and noise in the original LDR image, but low enough to avoid crossing edges between objects of the image. In various embodiments, the value of the standard deviation, $\sigma_r$, can be between 0.1 max(Y) and 0.5 max(Y), where max(Y) is the maximum luminance value over all pixels of the original image. In various embodiments, the standard deviation for the spatial Gaussian function $f_s$ can be set at $\sigma_s=3$, and the standard deviation for the luminance range Gaussian function $f_r$ can be set at or $=0.3\times max(Y)$.

$Y_{base}(p)$ 231 can be provided to high frequency extractor 221 of detail enhancer 215, which is described in more detail below. $Y_{base}(p)$ 231 can also be provided to zone expansion mapper 211.

Expansion Exponent Map:

Zone expansion mapper 211 can determine a zone expansion exponent map allowing to map low-pass filtered luminance values $Y_{base}(p)$ 231 into expansion exponent values E'(p), 235, zone parameters 205, and $L_{max}$ 229. Zone expansion exponent map, E'(p), 235 can be an image-sized floating point map, in which each value represents the exponent to be applied to Y(p) of each pixel in original LDR image 203. In various embodiments, an expansion exponent map, E(p), can be determined first.

In a variant of building an expansion exponent map, the expansion exponent map can be based on expansion exponent quadratic functions, such as:

$$E(p)=a(Y_{base})^2+bY_{base}+c \quad (2)$$

where the coefficients of the expansion exponent quadratic function, a, b, and c, can be parameters determined as follows based on the maximum display luminance, $L_{max}$:

$$a=p_{a1}\exp(p_{a2}L_{max})+p_{a3}\exp(p_{a4}L_{max}) \quad (3)$$

$$b=p_{b1}L_{max}{}^{pb2}+p_{b3} \quad (4)$$

$$c=1.3 \quad (5)$$

The parameters used in the above equations can be set, for example, as follows: $p_{a1}$=-8.192e-7, $p_{a2}$=0.000312, $p_{a3}$=1.657e-5, $p_{a4}$=-0.0006967, $p_{b1}$=0.05941, $p_{b2}$=0.03135, and $p_{b3}$=-0.07579.

It means that the expansion exponent quadratic function is defined in relationship with the maximum display luminance $L_{max}$.

In this way, for example, the shape of the expansion exponent map E(p) can change depending on the maximum display luminance, allowing for a global way of controlling the image appearance without requiring input from a user.

Then, the expansion exponent map, E(p), can be adjusted based on luminance zones. Zone expansion mapper 211 can adjust E(p) to obtain an zone expansion exponent map, E'(p). The zone expansion exponent map, E'(p), can be based on parameters that allow adjustment of the expansion exponent map, E(p), based on different zones of luminance.

In this way, for example, a user can be provided additional control over the expansion, which can, for example, allow a user to adjust the appearance of the resulting image and to better allow the user to convey (or preserve in the case of re-mastering) the director's intent. Independent adjusting of different luminance zones can, for example, allow better control of the luminance expansion in shadows and highlights.

In various embodiments, the minimum point of the curve of E(p) can be determined, and the value of E(p) at the minimum point, $Y_{base\_mid}$, can be obtained. The minimum point of E(p) can serve as a luminance zone boundary between two luminance zones of E(p).

Figure 3:
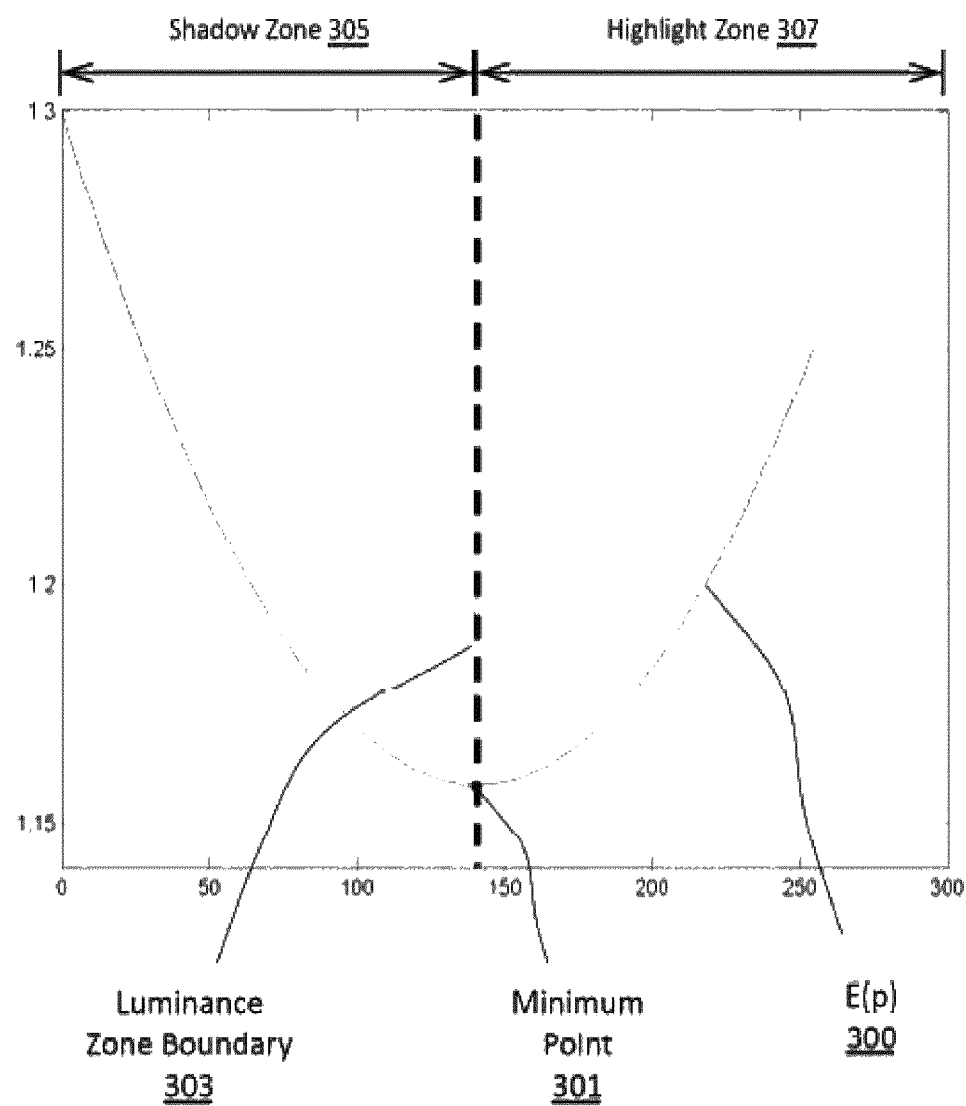
FIG. 3 illustrates an example of a curve E(p) and shows a minimum point of E(p) that can be used to define a luminance boundary zone according to various embodiments.

FIG. 3 illustrates an example of a curve E(p) 300, and shows a minimum point 301 of E(p) that can be used to define a luminance boundary zone 303 that divides luminance into two luminance zones, e.g., a shadow luminance zone 305 and a highlight luminance zone 307.

Thus, the two luminance zones can be based on the minimum point of the expansion exponent map E(p). The minimum point can be determined, for example, by determining for which base luminance value $Y_{base\_mid}$ the derivative of E(p) equals zero:

$$\delta E(p)=2aY_{base}+b \quad (6)$$

$$0=2a(Y_{base\_mid})+b \quad (7)$$

$$Y_{base\_mid}=-b/2a \quad (8)$$

The minimum point $GE_{min}$ is then:

$$GE_{min}=a(Y_{base\_mid})^2+bY_{base\_mid}+c \quad (9)$$

The minimum point of E(p) can be used a luminance zone boundary between two luminance zones. In various embodiments, the luminance zones, e.g., the left half and right half of the curve E(p), can be adjusted independently about the luminance zone boundary while maintaining continuity of the curve at the luminance zone boundary. In various embodiments, the luminance zones can be adjusted independently about the luminance zone boundary while also maintaining a smoothness of the curve at the luminance zone boundary.

Adjusting the left and right halves of curve E(p) in FIG. 3 can allow for independent adjustment of the expansion in shadows and highlights, respectively. Additionally, shifting the entire curve E(p) up or down can be used to adjust the expansion with a focus on midtones.

In various embodiments, luminance values can be divided into three different zones, a shadow zone, a midtone zone and a highlight zone. In this situation, the expansion exponent values E(p) in the shadow, highlight and midtone zone can be adjusted based on zone adjustment parameters, respectively $p_s$, $p_h$, and $p_m$, where $p_s$ is a shadow zone adjustment parameter, $p_h$ is a highlight zone adjustment parameter, and $p_m$ is a midtone adjustment parameter. The zone adjustment parameters can be used to compute new sets of a, b, and c values for the different quadratic curves E(p) of the different luminance zones. The zone adjustment parameters can be included in zone parameters 205 obtained from one or more input devices 201.

For example, for shadow luminance zone 303, a new set of coefficients, $a_s$, $b_s$, and $c_s$, can be determined to define the quadratic curve E(p) in the shadow luminance zone:

$$a_s = p_s a \tag{10}$$

$$b_s = p_s b \tag{11}$$

$$c_s = p_s(c - E_{min}) + p_m E_{min} \tag{12}$$

The same process can be applied to determine new coefficient values $a_h$, $b_h$, and $c_h$ for highlight luminance zone 305, replacing $p_s$ with $p_h$ in the equations 10 to 12 above. A zone expansion exponent map, E'(p), 235 can be determined:

$$E'(p) = a_s Y_{base}(p)^2 + b_s Y_{base}(p) + c_s, \text{ if } Y_{base}(p) < Y_{base\_mid}$$

and $$E'(p) = a_h Y_{base}(p)^2 + b_h Y_{base}(P) + c_h, \text{ if } Y_{base}(p) >= Y_{base\_mid} \tag{13}$$

Figure 4:
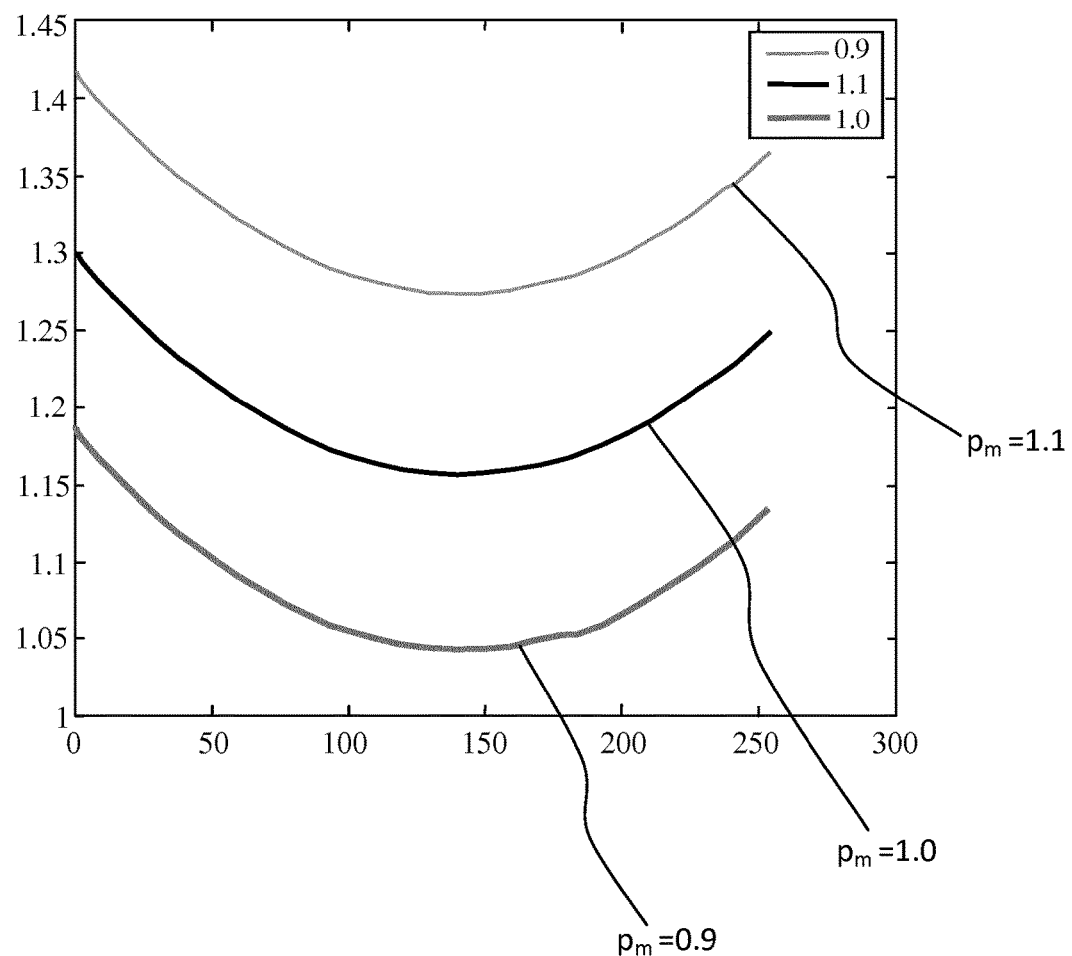
FIG. 4 illustrates an example of the effect on the curve E(p) of changing the midtone adjustment parameter, $p_m$, to obtain E'(p) according to various embodiments.
Figure 5:
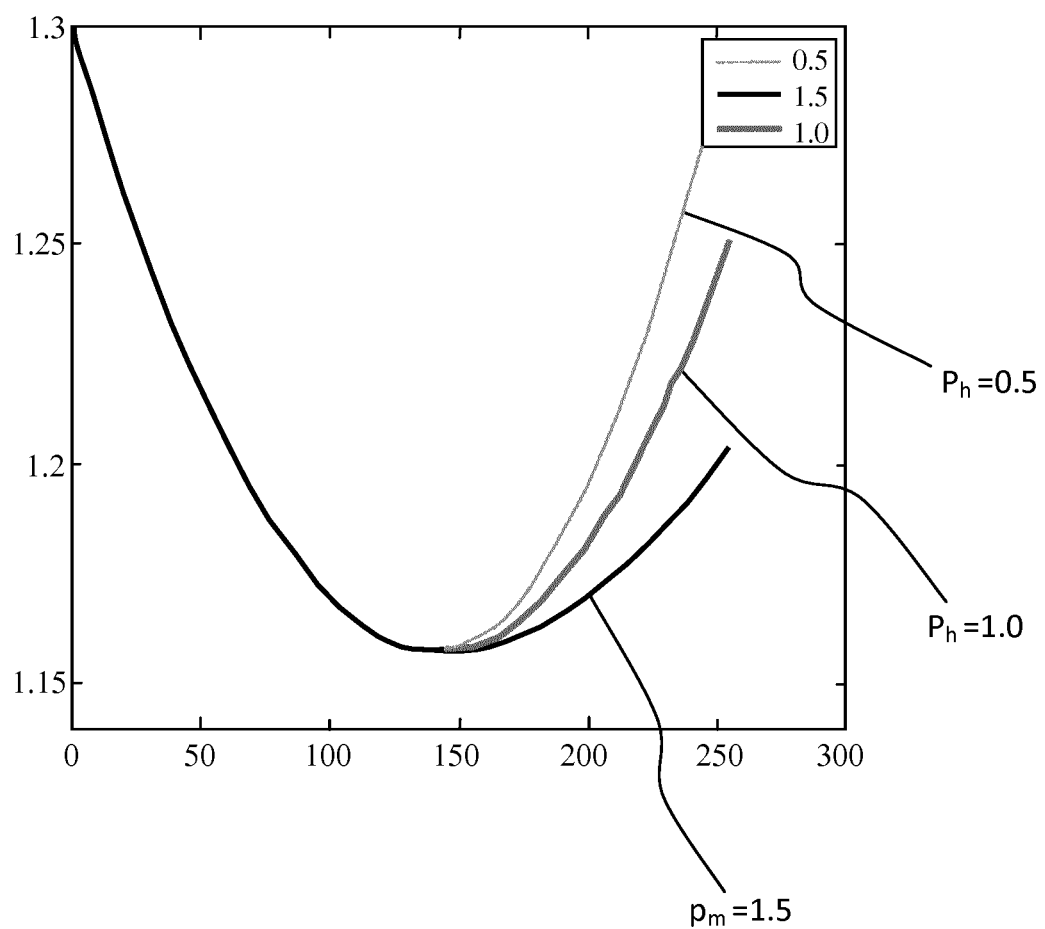
FIG. 5 illustrates an example of the effect on the curve E(p) of changing the highlight adjustment parameter, $p_h$, to obtain E'(p) according to various embodiments.
Figure 6:
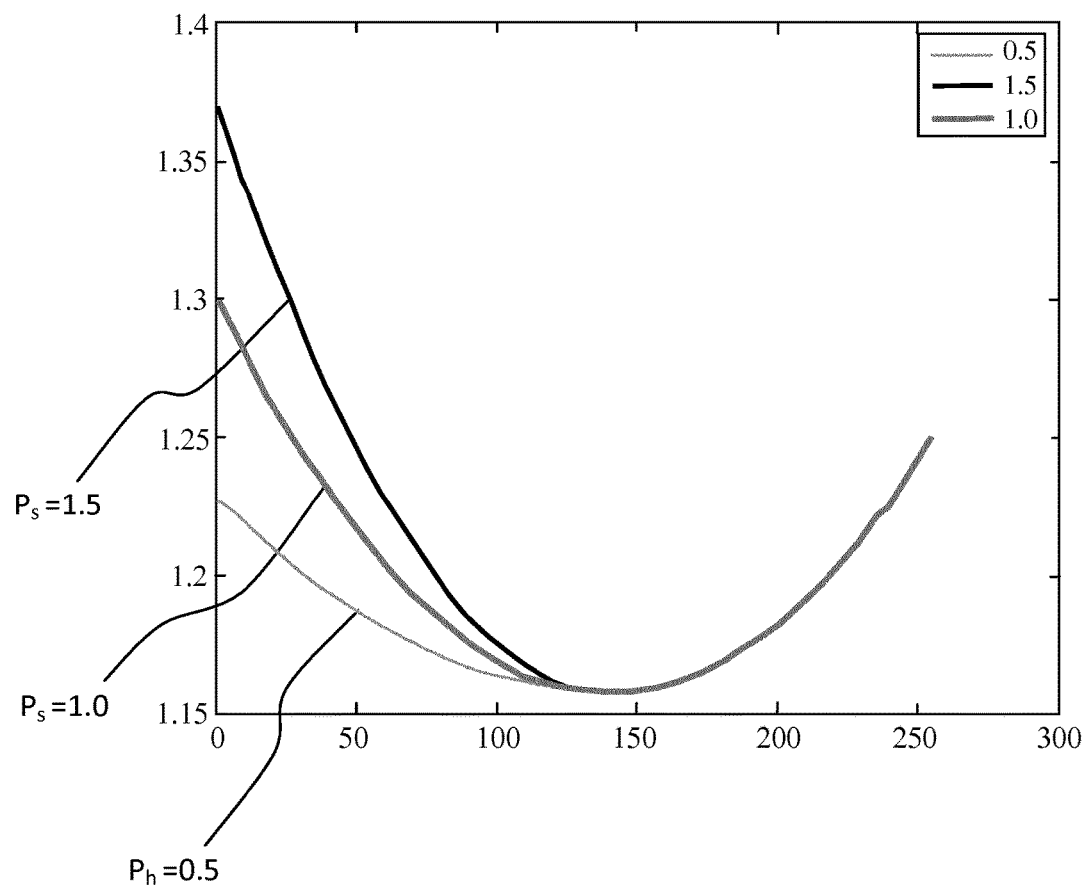
FIG. 6 illustrates an example of the effect on the curve E(p) of changing the shadow adjustment parameter, $p_s$, to obtain E'(p) according to various embodiments.

FIG. 4 illustrates an example of the effect on the curve E(p) of changing the midtone adjustment parameter, $p_m$, to obtain the global expansion exponent E'(p) curve according to various embodiments. FIG. 5 illustrates an example of the effect on the curve E(p) of changing the highlight adjustment parameter, $p_h$, to obtain E'(p) according to various embodiments. FIG. 6 illustrates an example of the effect on the curve E(p) of changing the shadow adjustment parameter, $p_s$, to obtain E'(p) according to various embodiments. In this embodiment, the expansion exponent value of each pixel is then performed according to an expansion exponent quadratic function which depends on the luminance zone to which luminance value of this pixel belongs. Here, we have two different expansion exponent quadratic functions, a first one defined by the parameters $a_s$, $b_s$ and $c_s$, and a second one defined by the parameters $a_h$, $b_h$ and $c_h$.

It should be noted that as the zone adjustment parameters change the values of a, b, and c for determining E(p), they interact with the $L_{max}$ parameter, as a, b, and c can also be determined based on $L_{max}$ to globally change the shape of the curve E(p).

The zone adjustment parameters can be user-adjustable via, for example, a user interface such as described above with respect to one or more input devices 201. In various embodiments, $L_{max}$ can be fixed when the zone adjustment parameters are user-adjustable. For example, $L_{max}$ can be fixed at 1000 nits.

Although the parameters defined above can allow a user to control different parts of the expansion exponent map and therefore fine-tune the appearance of the result, they are restricted in that the range of values considered as highlights and shadows is fixed, depending on the position of the minimum point of E(p).

In contrast, in various other embodiments, the luminance zone boundaries between different luminance zones can be adjustable. To allow for controlling which range of input luminance is considered to be shadows, midtones, or highlights, for example, two additional parameters can be used. For example, a shadow cutoff parameter, $k_s$, and a highlight cutoff parameter, $k_h$, can be used. In various embodiments, the zone cutoff parameters can be user-adjustable. The cutoff parameters can be included in zone parameters 205 obtained from one or more input devices 201.

Two luminance boundary values, $Y_{base\_s}$ and $Y_{base\_h}$, can be determined:

$$Y_{base\_s} = Y_{base\_min} - k_s(Y_{base\_min} - Y_{base\_mid}) \tag{14}$$

$$Y_{base\_h} = Y_{base\_min} - k_h(Y_{base\_min} - Y_{base\_mid}) \tag{15}$$

where $Y_{base\_min} = 0$ and $Y_{base\_mid} = 255$, for example.

Figure 7:
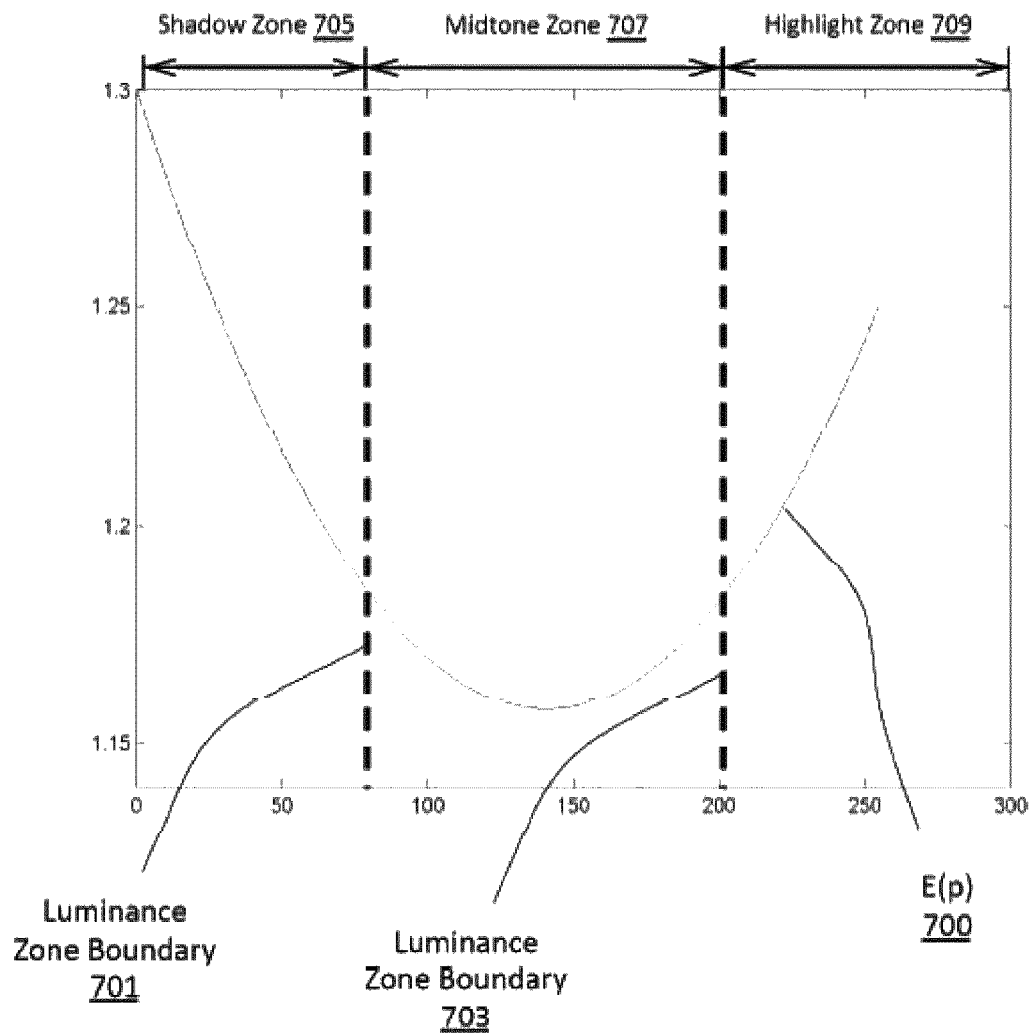
FIG. 7 illustrates an example of a zone expansion exponent map with a first luminance zone boundary based on a shadow cutoff parameter and a second luminance zone boundary based on a highlight cutoff parameter according to various embodiments.
Figure 8:
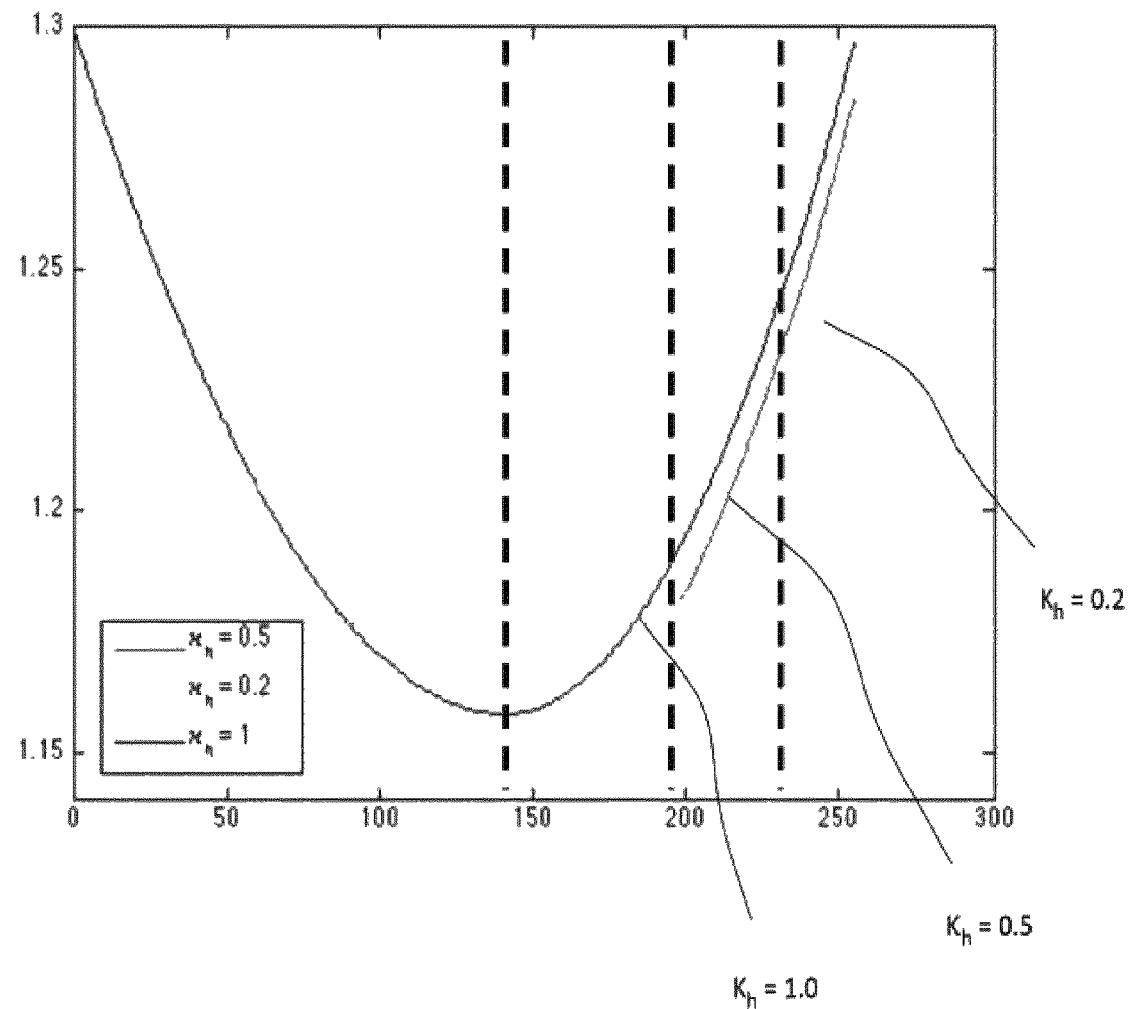
FIG. 8 illustrates an example of the effect on the curve E(p) of changing the highlight cutoff parameter, $k_h$, to obtain E'(p) according to various embodiments.

FIG. 7 illustrates an example of a zone expansion exponent map 700 with a first luminance zone boundary 701 based on a shadow cutoff parameter and a second luminance zone boundary 703 based on a highlight cutoff parameter. The luminance zone boundaries divide the luminance into a shadow zone 705, a midtone zone 707, and a highlight zone 709. FIG. 8 illustrates an example of the effect on the curve E(p) of changing the highlight cutoff parameter, $k_h$, to obtain E'(p) according to various embodiments.

The values of $Y_{base\_s}$ and $Y_{base\_h}$ can be used to determine an additional parameter of the quadratic for each region accordingly. For example, a new base c" parameter of the quadratic E(p) curve for the midtone zone can be determined:

$$c'' = c - E_{min} + p_m E_{min} \tag{16}$$

such that, in this midtone zone, we have: $E(p) = a(Y_{base})^2 + bY_{base} + c''$.

By shifting with a shift of $-E_{min} + p_m E_{min}$ the parameter c defining this quadratic curve in this way, for example, the effect of the midtone parameter, $p_m$, can be essentially incorporated. Next, expansion exponent values at the highlight cutoff point having a luminance value $Y_{base\_h}$ and at the shadow cutoff point having a luminance value $Y_{base\_s}$ can be determined:

$$E_s = a(Y_{base\_s})^2 + bY_{base\_s} + c'' \tag{17}$$

$$E_h = a(Y_{base\_h})^2 + bY_{base\_h} + c'' \tag{18}$$

Using these expansion exponent values $E_s$, $E_h$, the amount of shift can be known for each zone of the E(p) curve when computing parameters $c_s$ and $c_h$ respectively for the shadow part of the E(p) curve and highlights part of the E(p) curve, therefore ensuring that there are no discontinuities in the global quadratic E(p) curve:

$$c_s = p_s(c'' - E_s) + E_s \tag{19}$$

$$c_h = p_h(c'' - E_h) + E_h \tag{20}$$

The zone expansion exponent map, $E'(p)$, can then be determined:

$$E'(p) = a_s Y_{base}(p)^2 + b_s Y_{base}(p) + c_s, \text{ if } Y_{base}(p) < Y_{base\_s}$$

$$E'(p) = a_h Y_{base}(p)^2 + b_h Y_{base}(p) + c_h, \text{ if } Y_{base}(p) > Y_{base\_h}$$

and $$E'(p) = a Y_{base}(p)^2 + b Y_{base}(p) + c', \text{ if } Y_{base\_s} = < Y_{base}(p) = < Y_{base\_h} \quad (21)$$

In this embodiment, the expansion exponent value of each pixel is then again computed according to an expansion exponent quadratic function which depends on the luminance zone to which luminance value of this pixel belongs. Here, we have three different expansion exponent quadratic functions, a first one for the shadow zone defined by the parameters $a_s$, $b_s$ and $c_s$, and a second one for the highlight zone defined by the parameters $a_h$, $b_h$ and $c_h$, and a third one for the midtone zone defined by the parameters a, b and c".

Figure 9:
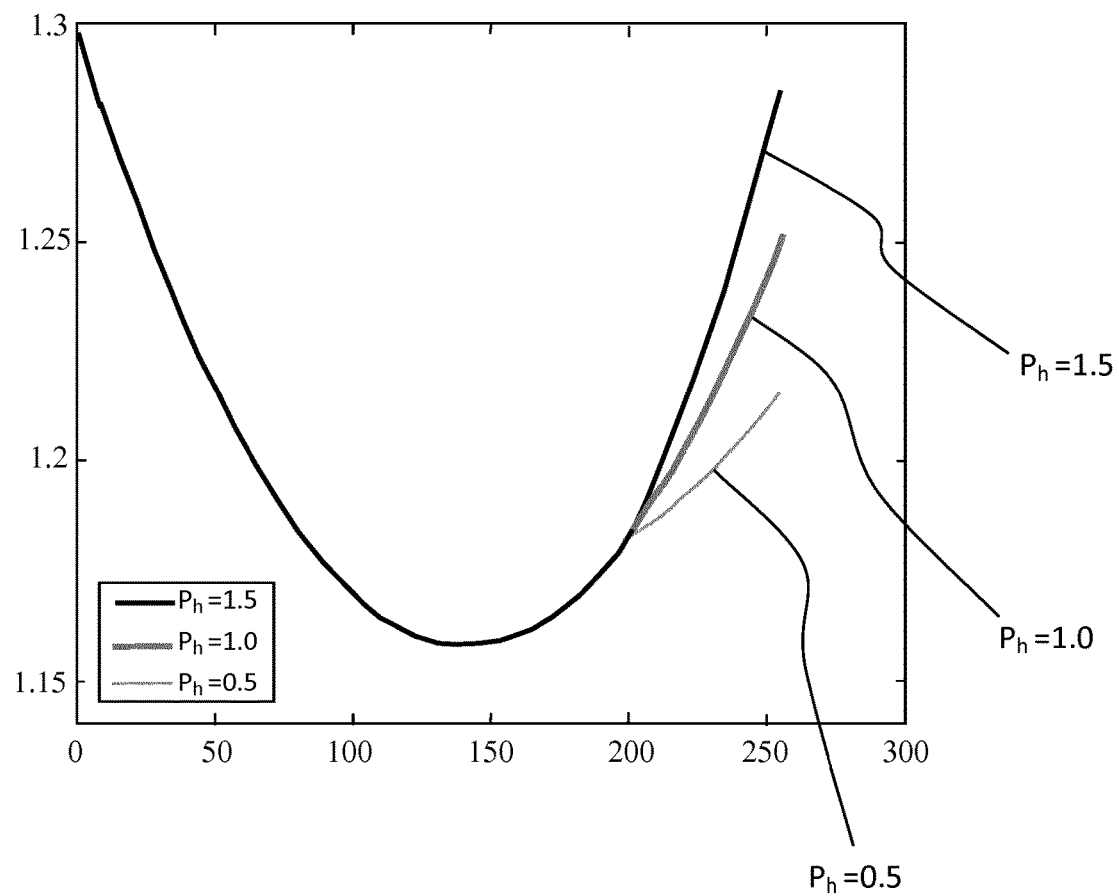
FIG. 9 illustrates an example of the effect on the curve E(p) of changing the highlight adjustment parameter, $p_h$, to obtain E'(p) according to various embodiments.

FIG. 9 illustrates an example of the effect on the curve $E(p)$ of changing the highlight adjustment parameter, $p_h$, to obtain $E'(p)$ according to various embodiments.

Figure 10:
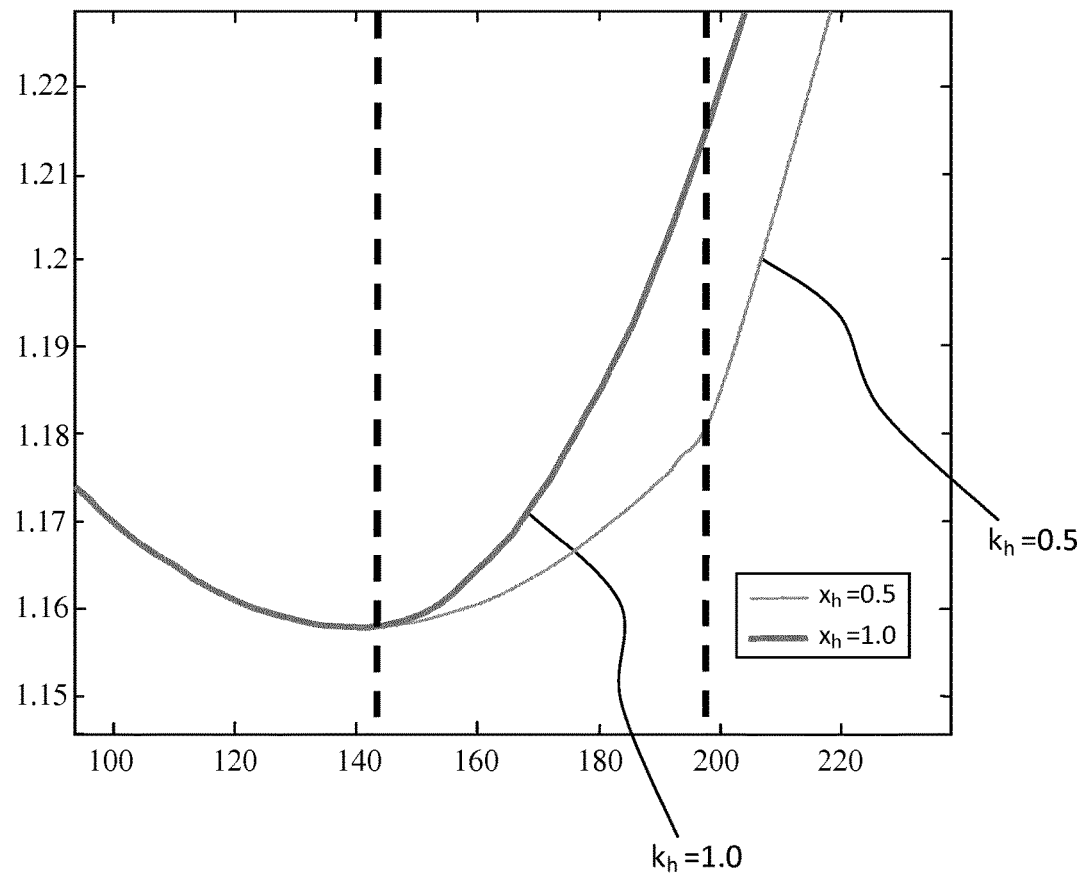
FIG. 10 illustrates an example of the effect on the curve E(p) of changing the highlight cutoff parameter, $k_h$, to obtain E'(p) according to various embodiments.

FIG. 10 illustrates an example of the effect on the curve $E(p)$ of changing the highlight cutoff parameter, $k_h$, to obtain $E'(p)$ according to various embodiments. With highlight parameter $p_h$=2.5 in this example, the highlight cutoff parameter was varied. When $k_h$=1.0 the curve maintains both continuity and smoothness. Different cutoff point values however can create corners in the expansion curve (e.g., continuity is maintained but smoothness is not maintained) as seen for $k_h$=0.5. It should be noted that while adjusting the cutoff parameter might make the curve not smooth, it does not create discontinuities in the image due to the exponential expansion function.

In preferred other various other embodiments of building an expansion exponent map, a spline-based interpolation method will be used to obtain a curve $E(p)$ from control points determined by the application of user parameters by a user. These control points correspond to specific points of the $E(p)$ curve. An advantage of these other embodiments is that not only the continuity of the $E(p)$ curve is maintained, but also its smoothness.

In this variant, the user parameters are applied on these control points instead of being applied directly on the $E(p)$ curve. By using such a spline interpolation, discontinuities in the image can be advantageously minimized even when extreme combinations of user parameters are applied by the user, since the spline will produce a smooth $E(p)$ curve.

Preferably, luminance is divided into three zones, a low zone (e.g., a shadow zone), a middle zone (e.g., a midtone zone), and a high zone (e.g., a highlight zone).

Preferably, these control points comprises the following points of the $E(p)$ curve: a low expansion exponent control point $C_1$ at the low luminance boundary of the low zone, a low-middle expansion exponent control point $C_2$ at the boundary between the low zone and the middle zone, a minimum expansion exponent control point $C_3$ of the $E(p)$ curve located in the middle zone, a middle-high expansion exponent control point $C_4$ at the boundary between the middle zone and the high zone, and a high expansion exponent control point $C_5$ at the high luminance boundary of the high zone. The low expansion exponent control point $C_1$ corresponds preferably to the minimum luminance value ($Y_{base}$=0). The low-middle expansion exponent control point $C_2$ corresponds to the shadow cutoff point above. The minimum expansion exponent control point $C_3$ is preferably located at the middle of the middle zone. The middle-high expansion exponent control point $C_4$ corresponds to the highlight cutoff point above. The high expansion exponent control point $C_5$ corresponds preferably to the maximum luminance value ($Y_{base}$=255 when 8 bits are used for luminance values).

For the control points, the following user parameters and variables are preferably considered:

The maximum display luminance $L_{max}$;

The luminance $\kappa_l$ at the boundary between the low zone and the middle zone;

the luminance is $\kappa_h$ at the boundary between the middle zone and the high zone;

User parameters for increasing or decreasing the luminance expansion in high, middle and low zones, denoted $p'_h$, $p'_m$, and $p'_s$ respectively; If the five control points are denoted by $C_1(i_1, e_1)$ to $C_5(i_5, e_5)$, where $i_n$ denotes the input luminance value of the $E(p)$ curve, i.e. $Y_{base}$, and $e_n$ the corresponding expansion map value for the expansion for expansion exponent control point $C_n$, then we have in table 1:

TABLE 1

| Control point | Input ($Y_{base}$) | Output (E) |
|---|---|---|
| $C_1$ | $i_1 = 0$ | $e_1 = c' + p'_s$ |
| $C_2$ | $i_2 = \kappa_l$ | $e_2 = a' * (i_2)^2 + b' * i_2 + c' + (1 - w_l)p'_s + w_l p'_m$ |
| $C_3$ | $i_3 = \kappa_l + 0.5(\kappa_h - \kappa_l)$ | $e_3 = a' * (i_3)^2 + b' * i_3 + c' + p'_m$ |
| $C_4$ | $i_4 = \kappa_h$ | $e_4 = a' * (i_5)^2 + b' * i_5 + c' + (1 - w_h)p'_m + w_h p_h$ |
| $C_5$ | $i_5 = 255$ | $e_5 = a' * (i_5)^2 + b' * i_5 + c' + p'_h$ | where $w_l$ and $w_h$ are weights depending on the placement of the control points located at boundaries between zones, namely $C_2$ and $C_4$, to allow for correct placement of the intermediate control points. These weights are for instance computed as $w_l$=0.5*($\kappa_l$+1) and $w_h$=0.5*($\kappa_h$+1.0), where a', b' and c' are defined as respectively a, b and c in equations 3 to 5 of the previous variants above and are coefficients defining an expansion exponent quadratic function as in equation 2 above.

For instance, the initial placement of the control points can follow a quadratic curve as defined in the variant described above in reference to these equations 2 to 5. Then, in this variant, these initial control points can be easily displaced by shifting them up or down according to the user parameters $p'_h$, $p'_m$, and $p'_s$ respectively for the high zone, the middle zone and the low zone. In this variant, many calculations that were required for variants above can be easily avoided. As a matter of fact, in this variant, we simply use one set of parameters a, b and c defining a quadratic curve according to equation 2 above. This gives a 'default' position for each of the control points C2 to C5. Then in the calculation of the en value of table 1 (n=1 to 5) of each control point, positions of these control points are shifted according the user parameters $p'_h$, $p'_m$, and $p'_s$. E.g. for C5, we only consider highlight parameter $p'_h$, while for C4 we consider both midtone parameter $p_m$ and highlight parameter $p_h$ since C4 is in the junction between midtone and highlight regions.

In the previous various embodiments above, we had to calculate different quadratic curves defined by different sets of a, b, c values to control each part of the curve. Here instead, we can just calculate a starting or "default" position for each control point based on one quadratic curve defined by one set of a', b', c' values and then move it up and down by adding a bit. E.g. for the control point C2, the starting default position gives the following quadratic curve: $e_2=a'^*(i_2)^2+b'^*i_2+c'$, which is then shifted with a shift+$(1-w_i)p'_s$+$w_ip'_m$ which is based on user parameters $p'_s$, $p'_m$. It means that, at the end of the process of positioning the different control points C1 to C, we still have three different quadratic curves (that are shifted one in comparison with another), but only one set of a', b', c' values, contrary to the previous various embodiments above.

Then, a spline interpolation is applied as described below to the combination of the different shifted quadratic curves, in order to obtain a global expansion exponent curve E(p).

Also note that the quadratic in this embodiment is evaluated ONLY for the control points. The remaining expansion exponent values are calculated through the spline interpolation which interpolates values between pairs of control points.

Once the five control points $C_1(i_1, e_1)$ to $C_5(i_5, e_5)$, above are computed, the whole expansion exponent map is interpolated from the different quadratic curves above using a spline-based interpolation applied preferably according to the following requirements:
a. The E(p) curve should go through all control points
b. The curve should not overshoot the data
c. The curve should be as smooth as possible Because of these requirements, a known cubic Hermite interpolating polynomial is preferably used to compute the spline. The interpolants are for instance:

$$h_{00}(t)=2t^3-3t^2+1 \quad \text{(S1a)}$$

$$h_{10}(t)=t^3-2t^2+t \quad \text{(S1b)}$$

$$h_{01}(t)=-2t^3+3t^2 \quad \text{(S1c)}$$

$$h_{11}(t)=t^3-t^2 \quad \text{(S1d)}$$

To construct the spline, the gradient of the E(p) curve is computed at each control point, preferably using finite differences as follows:

$$M_n = 0.5\left(\frac{e_n - e_{n-1}}{i_n - i_{n-1}} + \frac{e_{n+1} - e_n}{i_{n+1} - i_n}\right), \text{ for } n = 2, 3, 4 \quad \text{(S2)}$$

For the two extreme control points C1 and C5, $$M_1 = \frac{e_2 - e_1}{i_2 - i_1} \text{ and } M_5 = \frac{e_5 - e_4}{i_5 - i_4}.$$

Given the gradients and interpolant functions, the spline can be evaluated
for a given value $y \in Y_{base}$ as follows using the two closest control points in each case:

$$E(y)=h_{00}(t)e_n+h_{10}(t)(i_{n+1}-i_n)M_1+h_{01}(t)e_{n+1}+h_{11}(t)(i_{n+1}-i_n)M_{n+1} \quad \text{(S3)}$$

where $i_n < y \leq i_{n+1}$ and $$t = \frac{y - e_n}{i_{n+1} - i_n}.$$

Note that for the first expansion exponent control point C1, the interval $i_1 \leq y \leq i_2$ is considered.

Having applied such a spline interpolation method, a global E(p) curve and expansion exponent map is obtained.

Because the spline computation is an interpolation operation, the shape of the curve can be advantageously varied and adapted much more flexibly based on user parameters. By changing the user parameters above, notably $p'_h$, $p'_n$, and $p'_s$, a user can be provided better control over the expansion, notably in order to better convey the director's intent.

Advantageously, the amount of luminance expansion in each of the three luminance zones can be independently adjusted. In this way, for example, the expansion of the dynamic range of an image can be adjusted to account for how different luminance zones of the image respond to the expansion. In various embodiments, the luminance zone boundaries can be automatically selected based on an analysis of the image. In other various embodiments, the luminance zone boundaries can be user-selected.

Figure 12:
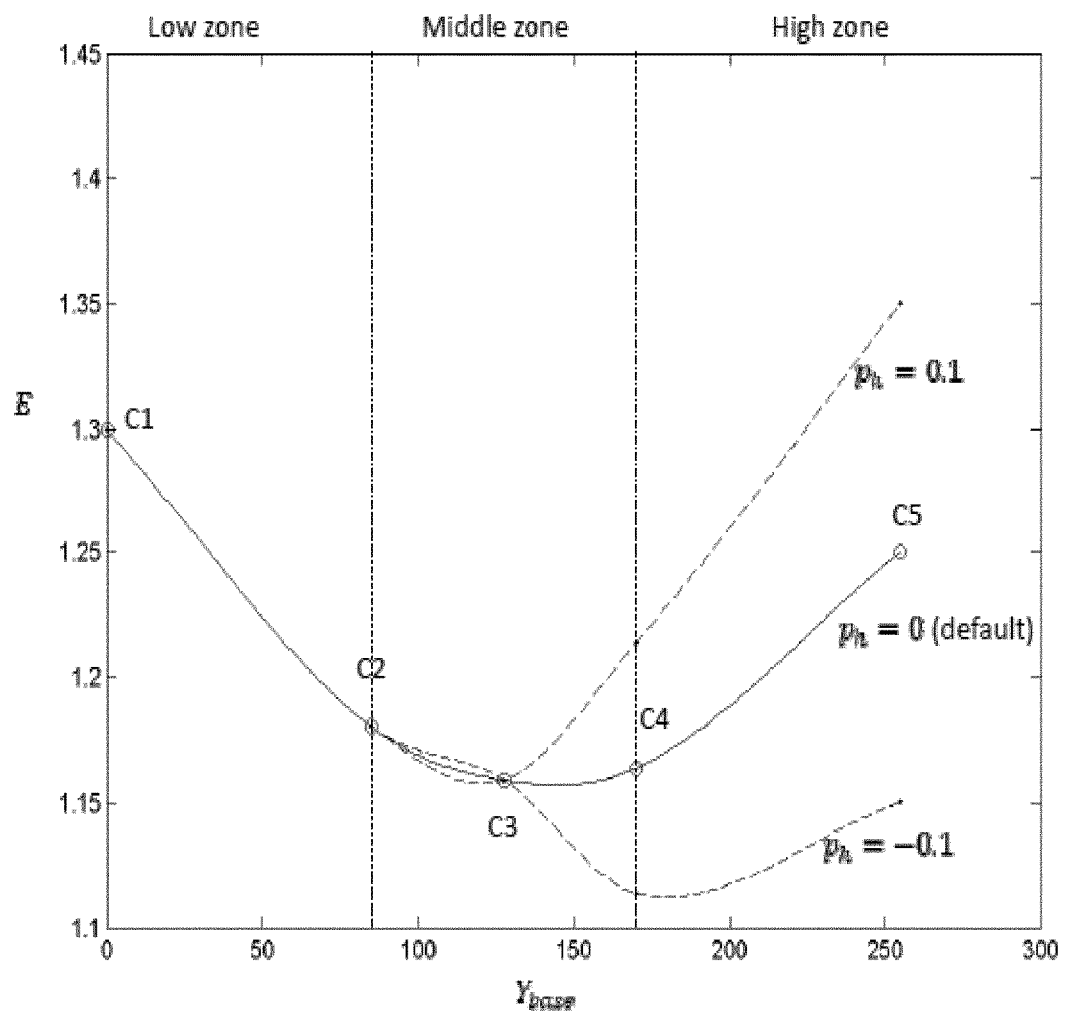
FIG. 12 illustrates different spline interpolated global E(p) curves that can be obtained using a spline interpolation method from the definition of one set of parameters a', b', c' defining a quadratic function and from the positioning of the five expansion exponent control points C1 to C5 in the different luminance zones, using different values for the user parameter $p_h$ concerning the highlight zone.

FIG. 12 illustrates examples of different global E(p) curves that can be obtained using this spline interpolation method from the positioning of the five expansion exponent control points C1 to C5, using different values for $p_h$.

Luminance Expansion Step (Per Se):

Referring again to FIG. 2, zone expansion exponent map E'(p) 235 or E(p) can be provided to inverse tone mapper 215, where the luminance Y(p) of each pixel p of the original LDR image 203 can be inverse tone mapped based on E'(p) 235 or E(p) into an expanded luminance $Y_{exp}(p)$ 237. In various embodiments, $Y_{exp}(p)$ 237 can be the luminance of the pixel Y(p) raised to the value of E'(p) or E(p):

$$Y_{exp}(p)=y(p)^{E'(p)} \quad (22)$$

Optional Denoising:

Since the luminance expansion is done in this embodiment through an exponential function, noise and other artifacts in Y may be amplified. Although this issue is managed to some extend by using $Y_{base}$ to compute E, in some cases—particularly in the presence of film grain—the amplification is sufficiently strong that it impacts visual quality. To avoid this, a noise reduction step can be incorporated in the luminance expansion step. It should be noted that this process should be optional and controllable as it is dependent on content and artistic preferences.

An example of denoising is described below.
a. A first step of denoising is a block based analysis. For each pixel i in the low-pass version of the image $Y_{base}$, we consider a block $B_i$ of size b×b. Within this block, we can compute a representation of edges as follows, leaving b as a user-parameter:

$$sumB_i = \frac{1}{b^2}\sum_{k \in B_i}|Y_{base}(k) - Y_{base}(i)|$$

b. After obtaining a measure of noise from the previous step, we can use that to guide the expansion. Instead of applying expansion equation (22) above directly to Y(i) for each pixel (i), we apply the expansion equation (22) on a weighted combination of Y(i) and $Y_{base}(i)$ as follows:

$$Y_{exp}(i) = \begin{cases} Y(i)^E, & sumB_i \geq \tau \\ (\alpha Y_{base}(i) + (1-\alpha)Y(i))^E, & sumB_i < \tau \end{cases} \quad \text{(S4)}$$

Where the weight $$\alpha = \frac{sumB_i}{\tau}$$

and the threshold $\tau=10$.

Advantageously, such a specific denoising process can be applied to the different luminance zones, using for instance the control points computed above. Specifically, instead of using a global threshold $\tau$, separate thresholds $\tau_s$, $\tau_m$ and $\tau_h$ may be defined for low, middle and high zone, respectively. Referring to Erreur ! Source du renvoi introuvable. above, pixels with values between $i_1$ and $i_2$ would follow Eq. (S4) with $\tau_s$, pixels between $i_2$ and $i_4$ would use $\tau_m$ and finally values above $i_4$ would use $\tau_h$.

Optional Application of Lift and Contrast:

In order to provide more control to the user over the luminance expansion above obtained by applying an exponent value E'(i) or E(i) to the luminance value Y(i) to expand (see Eq. 22 above—i represents a pixel instead of p), a contrast value s(i) and/or a lift value A(i) can be advantageous applied to the expanded luminance value obtained by Eq. (22), such that:

$$Y_{exp}(i) = s(i)Y(i)^{E(i)} + \lambda(i)L_{max} \quad (S5)$$

where s(i) corresponds to the contrast adjustment for pixel (i) and $\lambda(i)$ to the lift adjustment for pixel (i). This formulation follows the lift-gamma-gain model that is commonly used in color grading applications.

In practice it is preferred to apply these contrast values s(i) and/or lift values $\lambda(i)$ differently in high zone, in middle zone and in low zones. For this purpose, contrast parameters $s_h$, $s_m$ and $s_s$ are defined for the high, middle and low zones respectively, and similarly lift parameters $\lambda_h$, $\lambda_m$ and $\lambda_s$ are defined for the high, middle and low zones respectively. Such contrast and lift values can be advantageously set by the user.

Similar to the expansion exponent computation according to the second variant above, a contrast curve s(i) and a lift curve $\lambda_{(i)}$ are advantageously determined based respectively on at least five contrast and lift control points having the same luminance values as the expansion exponent control points C1 to C5 used for determining the E(p) curve above.

As in the second variant of the expansion exponent computation above, a spline-based interpolation is also used advantageously, as it is critical that the mapping is continuous and smooth. Five contrast control points $C_{s1}(i_1, o_{s1})$ to $C_{s5}(i_5, o_{s5})$ are defined to apply contrast adjustments and five lift control points $C_{\lambda1}(i_1, o_{\lambda1})$ to $C_{\lambda5}(i_5, o_{\lambda5})$ are defined to apply lift adjustments, where $i_n$ represents the input coordinates of the $n_{th}$ control point in either case and $o_{sn}$, $o_{\lambda n}$ represent the output coordinates for the contrast and lift control points respectively. Using these control points, for each pixel in $Y_{exp}(i)$, a contrast value s(i) and lift value $\lambda(i)$ are then computed using a spline based interpolation similar to that described above.

Although these contrast and lift adjustments are applied on an already expanded value $Y_{exp}$, the spline interpolation takes the original luminance value Y as input, in order to avoid inversions of control points that would lead to subsequent over and undershoots and clipping in the resulting spline curve. A reason for computing contrast and lift adjustments based on original input luminance Y is that, for two luminance values Y(k)>Y(l), it cannot be guaranteed that $Y_{exp}(k) > Y_{exp}(l)$. At the same time, the user defines how to define luminance zones according to the input content, so consequently, it is preferred to respect this even when applying the contrast and lift adjustment.

Based on that, control points for contrast and lift are given in Table 2 and Table 3 respectively. In both cases, for simplicity, the same input coordinates as those of the expansion control points $C_1$ to $C_5$ already used above (see Table 1) are kept. The output coordinates are then calculated as shown in these tables 2 (contrast) and 3 (lift) depending on the contrast and lift values provided by the user for each luminance zone.

TABLE 2

| Control point | Input | Output (Contrast) |
|---|---|---|
| $C_{s1}$ | $i_1 = 0$ | $o_{s1} = s_s$ |
| $C_{s2}$ | $i_2 = \kappa_l$ | $o_{s2} = (1 - w_l)s_s + w_l s_m$ |
| $C_{s3}$ | $i_3 = \kappa_l + 0.5(\kappa_h - \kappa_l)$ | $o_{s3} = s_m$ |
| $C_{s4}$ | $i_4 = \kappa_h$ | $o_{s4} = (1 - w_h)s_m + w_h s_h$ |
| $C_{s5}$ | $i_5 = 255$ | $o_{s5} = s_h$ |

TABLE 3

| Control point | Input (Y) | Output (E) |
|---|---|---|
| $C_{\lambda1}$ | $i_1 = 0$ | $\lambda_s$ |
| $C_{\lambda2}$ | $i_2 = \kappa_l$ | $(1 - w_l)\lambda_s + w_l\lambda_m$ |
| $C_{\lambda3}$ | $i_3 = \kappa_l + 0.50(\kappa_h - \kappa_l)$ | $\lambda_m$ |
| $C_{\lambda4}$ | $i_4 = \kappa_h$ | $(1 - w_h)\lambda_m + w_h\lambda_h$ |
| $C_{\lambda5}$ | $i_5 = 255$ | $\lambda_h$ |

To construct the global contrast curve s(i) based on its five contrast control points $C_{s1}(i_1, o_{s1})$ to $C_{s5}(i_5, o_{s5})$ and to construct the global lift curve $\lambda_{(i)}$ based on its five lift control points $C_{\lambda1}(i_1, o_{\lambda1})$ to $C_{\lambda5}(i_5, o_{\lambda5})$ using the same spline interpolation method as above, a gradient is computed at each control point following Eq. (S2) above, but using the control points defined in the above tables 2 and 3, obtaining tangents $M_{sn}$ and $M_{\lambda n}$ for the $n_{th}$ control point for contrast and lift respectively.

Since the same spline form is used, the interpolants defined above in Equations (S1a-d) can be re-used, allowing then to compute a contrast curve s(i) and a lift curve $\lambda(i)$ for a given input luminance pixel Y(i), using Eq. (S3) above.

These curves can then directly be used in Eq. (S5) to obtain the final expanded luminance value for each pixel:

$$Y_{exp}(i) = s(i)Y(i)^{E(i)} + \lambda(i)L_{max}$$

Again, the shape of the contrast and lift curves can be advantageously varied and adapted based on user parameters. By changing the user parameters independently in the different luminance zones, notably the contrast values $s_h$, $s_m$ and $s_s$, and the lift values $\lambda_h$, $\lambda_m$ and $\lambda_s$, a user can be provided better control over the luminance expansion, notably in order to better convey the director's intent.

Figure 13:
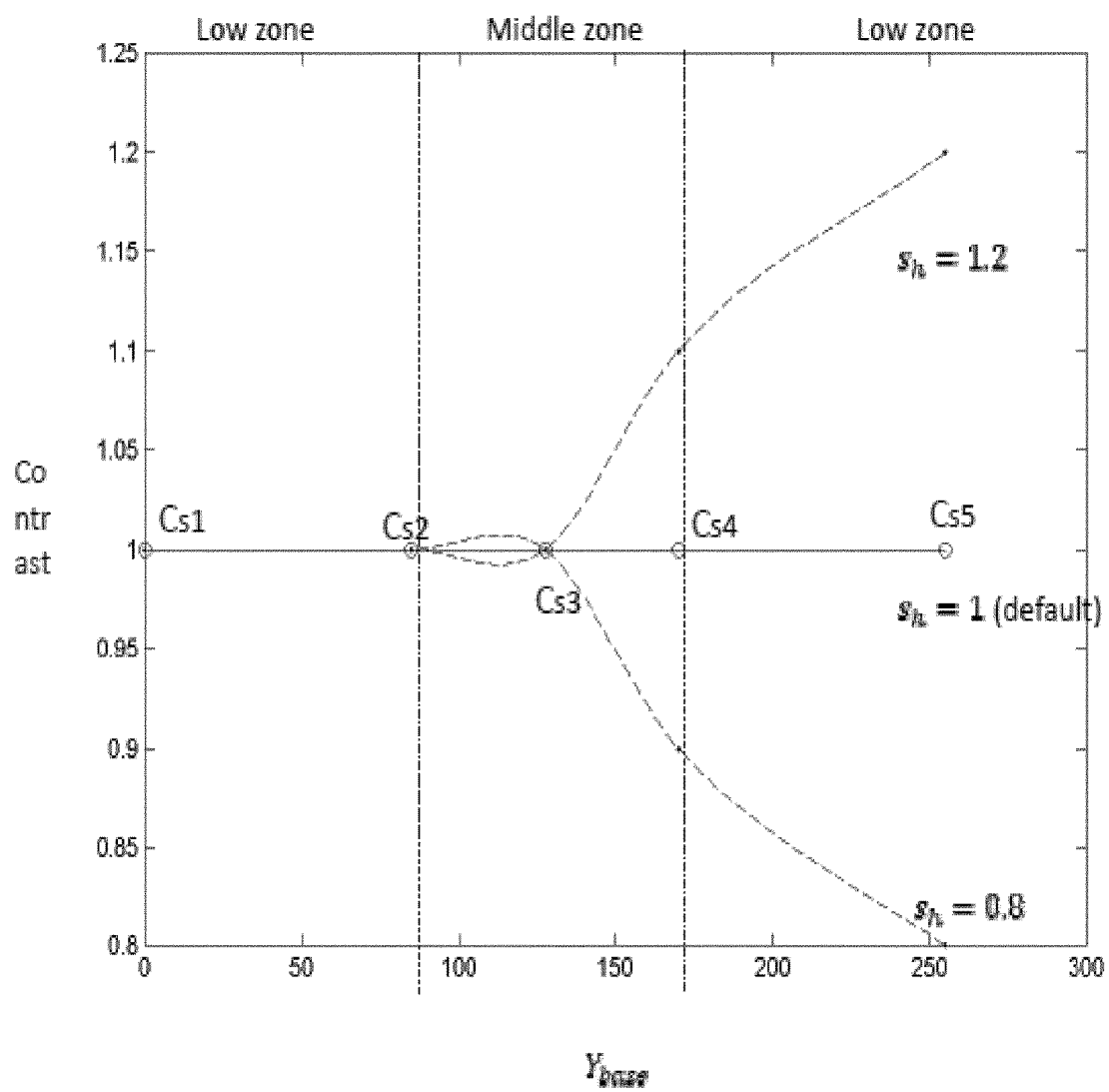
FIG. 13 illustrates different spline interpolated global contrast curves computed from the positioning of the five contrast control points $C_{s1}$ to $C_{s5}$, for different values of the contrast parameter $s_h$ concerning the highlight zone.
Figure 14:
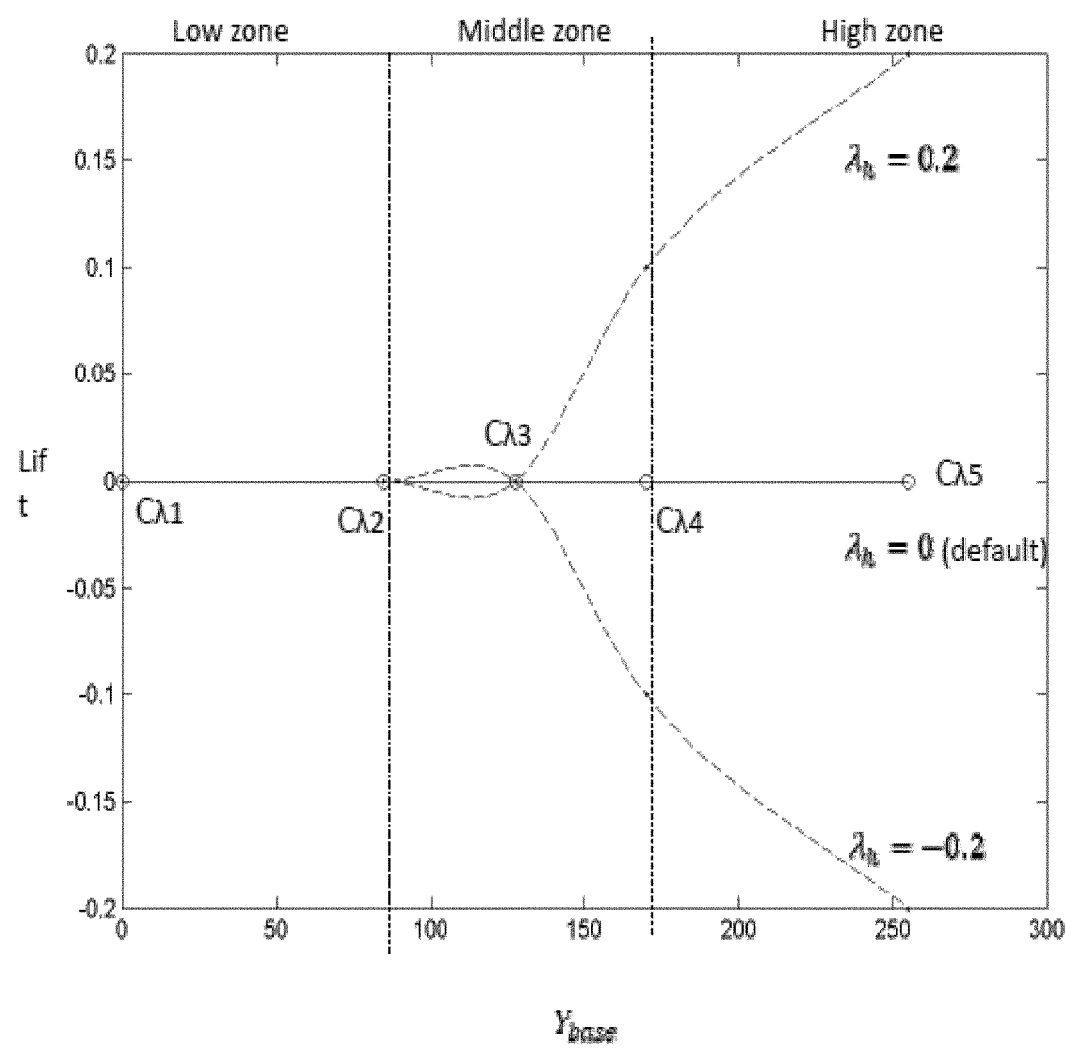
FIG. 14 illustrates different spline interpolated global lift curves computed from the positioning of the five lift control points $C_{\lambda 1}$ to $C_{\lambda 5}$, for different values of the lift parameter $s_h$ concerning the highlight zone.

FIG. 13 illustrates different global contrast curves computed from the positioning of the five contrast control points $C_{s1}$ to $C_{s5}$, for different values of the contrast parameter $s_h$. Similarly, FIG. 14 illustrates different global contrast curves computed from the positioning of the five lift control points $C_{\lambda1}$ to $C_{\lambda5}$, for different values of the contrast parameter $s_h$.

Sharpness Improving Step:

After the luminance expansion process above, local detail can be optionally enhanced by using a high pass version of the image $Y_{detail}$.

To perform such local detail enhancement, $Y_{exp}(p)$ 237 can be provided to luminance enhancer 223 of detail enhancer 215, where various enhancements can be applied as described in more detail below.

High frequency extractor 221 of detail enhancer 215 can obtain base luminance $Y_{base}(p)$ 231 and luminance $Y(p)$ 225 and determine a luminance detail map, $Y_{detail}(p)$, 233 based on $Y_{base}(p)$ and $Y(p)$.

For example, in various embodiments $Y_{detail}(p)$ can be determined by first determining:

$$Y'_{base}(P) = \Sigma_{i \in \Omega''} Y(p_i) f''_s(\|p_i - p\|) f''_r(\|Y(p_i) - Y(p)\|) \qquad (23)$$

where $f''_s$ and $f''_r$ are the same Gaussian functions as above ($f'_s$, $f'_r$), but with larger standard deviation in the luminance range in order to remove more luminance details in the image,
where $\Omega''$ is the size of a window of the image centered at the pixel, p, which can have the same size as above, and where $p_i$ is a pixel in this window.

Thus, $Y'_{base}(p)$ can be determined by filtering $Y(p)$ in a similar way that $Y_{base}(p)$ is determined, but with parameters that remove more luminance details. For example, in various embodiments the standard deviation for the spatial Gaussian function $f''_s$ can be set such that $\sigma''_s = \sigma'_s$, and the standard deviation for the luminance range Gaussian function $f''_r$ can be set such as to remove more luminance details in the image, i.e., such that $\sigma''_r > \sigma'_r$. For instance $\sigma''_r$ can be set equal to 0.3×max(Y).

High frequency extractor 221 can determine $Y_{detail}(p)$ as the ratio of $Y_{base}(p)$ and $Y'_{base}(p)$:

$$Y_{detail}(P) = Y_{base}(p)/Y'_{base}(p) \qquad (24)$$

Because $\sigma''_r > \sigma'_r$, this ratio corresponds to an extraction of high spatial frequencies of luminance values in the image. Other ways of extraction of high spatial frequencies of luminance values in the image can be used without departing from the disclosure.

Luminance enhancer 223 can enhance $Y_{exp}(p)$ 237 by applying luminance detail map, $Y_{detail}(p)$, 233. For example, an enhanced expanded luminance, $Y'_{exp}(p)$, 239 can be determined based on the product of the expanded luminance and the luminance detail map, for example, for each pixel (p):

$$Y'_{exp}(p) = Y(p)^{E'(p)} \times [Y_{detail}(p)]^d \qquad (25)$$

where d (shown as 207 in FIG. 2) is a detail enhancement parameter. The detail enhancement parameter d can control the amount of detail enhancement applied by the luminance detail map, $Y_{detail}(p)$. For example, increasing the value of d increases the contrast of image edges. In various embodiments, a value of d=1.5 can be used.

Scaling of the Chromatic Channel (Including an Optional Adjustment of Saturation):

When expanding the luminance $Y(p)$ of the original LDR image as described above into an expanded luminance value $Y'_{exp}(p)$, the appearance of color and saturation in the expanded image can be affected. Before recombining the different color components of the image and returning to RGB, the two chromatic channels Cb and Cr need to be scaled according to the expansion applied in Y, to ensure that saturation in the image is preserved.

In this regard, color information of the image may be adjusted by saturation enhancer 217. For example, saturation enhancer 217 can be used to preserve the artistic intent with respect to the color of the image. In various embodiments, saturations of colors can be enhanced using the expansion exponent values as a guide. More specifically, the saturation of the color of each pixel can be enhanced based on the zone expansion exponent map, E'(p), of the pixel.

For example, saturation of the color of a pixel p can be enhanced by adjusting a chroma value C(p) of the pixel. The chroma value can be determined as follows in a cylindrical version of the YUV space:

$$C(p) = \sqrt{U(p)^2 + V(p)^2} \qquad (26)$$

An adjusted chroma value C'(p) can be determined as the product of zone expansion exponent map E'(p) of the pixel p and the chroma value C(p) of the pixel:

$$C'(p) = E'(p) \times C(p) \qquad (27)$$

In various embodiments, the chroma scaling, which transforms C(p) into C'(p), can be limited to a factor of 1.5 to avoid over-saturating highlights, e.g., to avoid light explosions and bright lights.

With these new values of C'(p), enhanced values of chrominance, U'(p) and V'(p), 241 can be calculated by converting from a cylindrical color space, such as LCH here, to a YUV space:

$$U'(p) = \cos[H(p)] \times C'(p) \qquad (28)$$

$$V'(p) = \sin[(H(p)] \times C'(p) \qquad (29)$$

where H(p) is the original hue computed from original U(p) and V(p) as follows:

$$H(p) = \arctan[V(p), U(p)] \qquad (30)$$

Optionally, it is also possible to introduce a user parameter $p_{sat}$ for additionally controlling global image saturation. Then, the output chromatic channels are computed as follows:

$$Cb_{exp} = CbR_{chrom} p_{sat}$$

$$Cr_{exp} = CrR_{chrom} p_{sat}$$

where $R_{chrom}$ is a per-pixel scaling factor computed as $$R_{chrom} = \frac{Y'_{exp}}{Y}.$$

If $p_{sat} = 1$, saturation should remain the same in the image after this scaling process (within the limitations of the color space used and the fact that the ITMO is operating on gammatized content).

Optionally, it is also possible to adjust the saturation in the different luminance zones by setting a $p_{sat}$ parameter separately for low, middle and high zones, $p_{sat_s}$, $p_{sat_m}$ and $p_{sat_h}$ respectively. To determine how each pixel should be adjusted, the three zones are defined by considering the intervals $[i_1, i_2]$ for shadows, $[i_2, i_4]$ for midtones and $[i_4, i_5]$ for highlights. Effectively, the cutoff points C2, C4 defined above for the computing of the expansion exponent map can be advantageously reused here to adjust saturation separately per luminance zones.

If hard thresholds are used between the luminance zones as described above to adjust the saturation, discontinuities may appear in areas of smoothly changing luminance. To avoid this issue, a smooth transition area is preferably introduced around each transition point, where the saturation parameter varies smoothly. To that end, tolerance intervals $v_s$, $v_m$ and $v_h$ are for instance defined for each luminance zone as a percentage of the distance between control points:

$v_s = |0.2(i_2 - i_1)|$ $v_m = |0.2(i_4 - i_2)|$ $v_h = |0.2(i_5 - i_4)|$

Another option for such a smooth transition would be to repeat the process used above for calculating contrast or lift curves.

Using the above, the chromatic value for a pixel i can be computed as follows for the chromatic channel Cb:

$$Cb_{exp}(i) = \begin{cases} Cb(i)R_{chrom}(i)p_{sat_s}, & Y(i) < i_2 - v_s \\ Cb(i)R_{chrom}(i)((1-w_l)p_{sat_s} + w_l p_{sat_m}), & i_2 - v_2 \leq Y(i) < i_2 + v_m \\ Cb(i)R_{chrom}(i)p_{sat_m}, & i_2 + v_2 \leq Y(i) < i_4 - v_m \\ Cb(i)R_{chrom}(i)((1-w_h)p_{sat_m} + w_h p_{sat_h}), & i_4 - v_m \leq Y(i) < i_4 + v_h \\ Cb(i)R_{chrom}(i)p_{sat_h}, & i_4 + v_h \leq Y(i) \end{cases}$$

The same computing is applied to the other chromatic channel Cr.

Recombining the Image and Returning to RGB:

The Y, Cb and Cr channels representing colors of the expanded image are then recombined and then converted, if necessary, to the display color space, using known color space conversions. A post-processor 242 can combine the enhanced values of chrominance U'(p) and V'(p) 241 with enhanced expanded luminance $Y'_{exp}(p)$ 239 to obtain and provide an expanded HDR image 243.

Expanded HDR image 243 can be displayed on HDR display device 219. Of course, one skilled in the art would understand that expanded HDR image 243 may require conversion into a color space of the display device, such as RGB, before being displayed.

Figure 11:
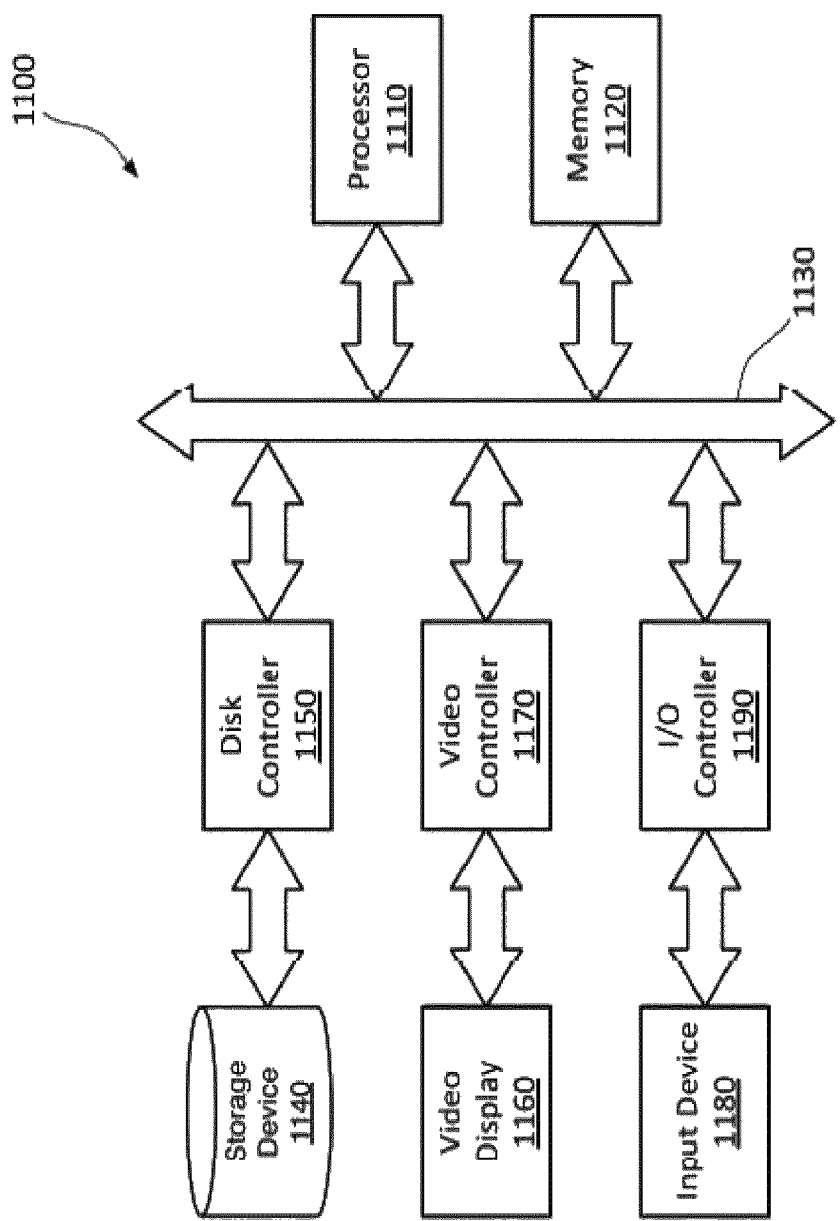
FIG. 11 illustrates another example of an apparatus according to various embodiments.

FIG. 11 illustrates another example of an apparatus according to various embodiments. FIG. 11 is a block diagram of an apparatus 1100 for implementing various techniques described above for expanding dynamic range based on luminance zones. Apparatus 1100 may be implemented, for example, as a general-purpose computing platform.

Apparatus 1100 can include a processor 1110 for executing the computer-executable programs that perform various techniques described above. The programs may be stored in a memory 1120, which may also store image data. A bus 1130 can connect processor 1110 and memory 1120 to each other and to other components of apparatus 1100. In some embodiments, apparatus 1100 may include multiple processors or processors with multiple processing cores, which may execute various parts of programs in parallel.

A mass storage device 1140 can be connected to bus 1130 via a disk controller 1150. Mass storage device 1140 may contain image or video data, as well as an operating system, other programs, other data, etc. Disk controller 1150 may operate according to Serial Advanced Technology Advancement (SATA), Small Computer System Interface (SCSI), or other standards, and may provide connection to multiple mass storage devices.

A video display 1160 can be connected to bus 1130 via a video controller 1170. Video controller 1170 may provide its own memory and graphics-processing capability for use in implementing or accelerating certain aspects of the processes of expanding dynamic range, as well as for providing the functions of image and UI display.

An input device 1180 can be connected to bus 1130 via an input/output (I/O) controller 1190. I/O controller 1190 may utilize one or more of USB, IEEE 1394a, or other standards. Multiple input devices may be connected, such as keyboards, mice, and trackpads. Image and video capture devices may also be connected to the system through I/O controller 1190 or additional I/O controllers implementing other I/O standards. Networking functionality may be provided by I/O controller 1190 or a separate I/O controller.

It will be recognized by one skilled in the art that various aspects of the methods of the present disclosure may be executed in parallel on multiple systems to provide faster processing. For instance, in the case of processing a video file, frames may be divided among tens or hundreds of computing systems to provide parallel processing. Particular components, such as video display 1160, may be omitted in some systems in some operating environments.

Furthermore, multiple systems may utilize shared storage accessed via an I/O bus or via a network.

It should also be appreciated that although various examples of various embodiments have been shown and described in detail herein, those skilled in the art can readily devise other varied embodiments that still remain within the scope of this disclosure.

All examples and conditional language recited herein are intended for instructional purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry, electrical components, optical components, etc., embodying the principles of the disclosure. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. Such a software can take the form of, for example, stand-alone software, a plug-in to be integrated to another software, etc. The application program may be uploaded to, and executed by, an image processing device comprising any suitable architecture. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included.

Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a combination of circuit elements that performs that function, software in any form, including, therefore, firmware, microcode or the like, combined with appropriate circuitry for executing that software to perform the function, etc. The disclosure as defined by such claims resides in the fact that the functionalities provided by the various recited means are combined and brought together in the manner which the claims call for. It is thus regarded that any means that can provide those functionalities are equivalent to those shown herein.

While the present disclosure is described with respect to particular examples and preferred embodiments, it is understood that the present disclosure is not limited to these examples and embodiments. The present disclosure as claimed therefore includes variations from the particular examples and preferred embodiments described herein, as will be apparent to one of skill in the art. While some of the specific embodiments may be described and claimed separately, it is understood that the various features of embodiments described and claimed herein may be used in combination. Reference numerals appearing in the claims are by way of illustration only and shall have no limiting effect on the scope of the claims.

The invention claimed is:

1. A method for providing an expanded dynamic range image from a digital image defined by pixels associated with colors represented in a color space separating luminance (Y) from chrominance, comprising:
    determining a plurality of luminance zones in which luminance values representing said colors of pixels are distributed,
    for each of said plurality of luminance zones, defining an expansion exponent quadratic function of low-pass filtered luminance determining an expansion exponent value E(p) for each pixel (p) of said luminance zone,
    inverse tone mapping luminance value of each pixel by applying an expansion exponent value E(p) to said luminance value, wherein said expansion exponent value E(p) is obtained by applying to a low-pass filtered luminance value of said luminance value the expansion exponent quadratic function of the luminance zone to which said luminance value belongs, and
    providing the expanded dynamic range image based on the inverse tone mapped luminance values,
    wherein said plurality of luminance zones comprises at least three luminance zones, a low zone for luminances of low values, a high zone for luminances of high values, and a middle zone for luminances comprised between luminances of low values and luminances of high values,
    wherein said expansion exponent quadratic functions are defined by one set of three parameters a', b', c' and by the position of at least five expansion exponent control points such that:
        said expansion exponent quadratic function determining expansion exponent values in middle zone passes through the second, third, fourth of these five expansion exponent control points,
        said expansion exponent quadratic function determining expansion exponent values in low zone passes through the first and second of these five expansion exponent control points, and
        said expansion exponent quadratic function determining expansion exponent values in high zone passes through the fourth and fifth of these five expansion exponent control points.

2. The method for providing an expanded dynamic range image according to claim 1, comprising interpolating a global expansion exponent curve from the different expansion exponent quadratic functions, using a spline interpolation method.

3. The method for providing an expanded dynamic range image according to claim 1, comprising determining a contrast value for each pixel (p) of said digital image, wherein inverse tone mapping luminance value Y(p) of said pixel comprises multiplying luminance value obtained by the application of said expansion exponent value E(p) by said determined contrast value.

4. The method for providing an expanded dynamic range image according to claim 3, wherein determining a contrast value for each pixel (p) is performed according to the luminance zone to which luminance value Y(p) of said pixel belongs.

5. The method for providing an expanded dynamic range image according to claim 1, comprising determining a lift value for each pixel (p) of said digital image, wherein inverse tone mapping luminance value Y(p) of said pixel comprises shifting luminance value obtained by the application of said expansion exponent value E(p) by said lift value.

6. The method for providing an expanded dynamic range image according to claim 5, wherein determining a lift value for each pixel (p) is performed according to the luminance zone to which luminance value Y(p) of said pixel belongs.

7. The method for providing an expanded dynamic range image according to claim 6, wherein determining a lift value for each pixel of said digital image is performed according to a lift quadratic function of said luminance values which depends on the luminance zone to which luminance value Y(p) of said pixel belongs, wherein said lift quadratic functions are defined through at least five lift control points such that:
    said lift quadratic function determining lift values in middle zone passes through the second, third, fourth of these five lift control points,
    said lift quadratic function determining lift values in low zone passes through the first and second of these five lift control points, and
    said lift quadratic function determining lift values in high zone passes through the fourth and fifth of these five lift control points, and
    wherein said method comprises interpolating a global lift curve from the different lift quadratic functions using a spline interpolation method.

8. An apparatus for providing an expanded dynamic range image from a digital image defined by pixels associated with colors represented in a color space separating luminance (Y) from chrominance, comprising a processing unit configured to:
    determine a plurality of luminance zones in which luminance values representing said colors of pixels are distributed, for each of said plurality of luminance zones, define an expansion exponent quadratic function of low-pass filtered luminance determining an expansion exponent value E(p) for each pixel (p) of said luminance zone, inverse tone map luminance value of each pixel by applying an expansion exponent value E(p) to said luminance value, wherein said expansion exponent value E(p) is obtained by applying to a low-pass filtered luminance value of said luminance value the expansion exponent quadratic function of the luminance zone to which said luminance value belongs, and provide the expanded dynamic range image based on the inverse tone mapped luminance values, wherein said plurality of luminance zones comprises at least three luminance zones, a low zone for luminances of low values, a high zone for luminances of high values, and a middle zone for luminances comprised between luminances of low values and luminances of high values, wherein said expansion exponent quadratic functions are defined by one set of three parameters a', b', c' and by the position of at least five expansion exponent control points such that:

said expansion exponent quadratic function determining expansion exponent values in middle zone passes through the second, third, fourth of these five expansion exponent control points, said expansion exponent quadratic function determining expansion exponent values in low zone passes through the first and second of these five expansion exponent control points, and said expansion exponent quadratic function determining expansion exponent values in high zone passes through the fourth and fifth of these five expansion exponent control points.

9. The apparatus of claim 8, wherein the processing unit is further configured to interpolate a global expansion exponent curve from the different expansion exponent quadratic functions, using a spline interpolation method.

10. The apparatus of claim 8, wherein the processing unit is further configured to determine a contrast value for each pixel (p) of said digital image, wherein inverse tone mapping luminance value Y(p) of said pixel comprises multiplying luminance value obtained by the application of said expansion exponent value E(p) by said determined contrast value.

11. The apparatus of claim 10, wherein determining a contrast value for each pixel (p) is performed according to the luminance zone to which luminance value Y(p) of said pixel belongs.

12. The apparatus of claim 8, wherein the processing unit is further configured to determine a lift value for each pixel (p) of said digital image, wherein inverse tone mapping luminance value Y(p) of said pixel comprises shifting luminance value obtained by the application of said expansion exponent value E(p) by said lift value.

13. The apparatus of claim 12, wherein determining a lift value for each pixel (p) is performed according to the luminance zone to which luminance value Y(p) of said pixel belongs.

14. The apparatus of claim 13, wherein determining a lift value for each pixel of said digital image is performed according to a lift quadratic function of said luminance values which depends on the luminance zone to which luminance value Y(p) of said pixel belongs, wherein said lift quadratic functions are defined through at least five lift control points such that:

said lift quadratic function determining lift values in middle zone passes through the second, third, fourth of these five lift control points, said lift quadratic function determining lift values in low zone passes through the first and second of these five lift control points, and said lift quadratic function determining lift values in high zone passes through the fourth and fifth of these five lift control points, and wherein said processing unit is further configured to interpolate a global lift curve from the different lift quadratic functions using a spline interpolation method.

15. A non-transitory computer-readable medium storing computer-executable instructions executable to provide an expanded dynamic range image from a digital image defined by pixels associated with colors represented in a color space separating luminance (Y) from chrominance, by:

determining a plurality of luminance zones in which luminance values representing said colors of pixels are distributed, for each of said plurality of luminance zones, defining an expansion exponent quadratic function of low-pass filtered luminance determining an expansion exponent value E(p) for each pixel (p) of said luminance zone, inverse tone mapping luminance value of each pixel by applying an expansion exponent value E(p) to said luminance value, wherein said expansion exponent value E(p) is obtained by applying to a low-pass filtered luminance value of said luminance value the expansion exponent quadratic function of the luminance zone to which said luminance value belongs, and providing the expanded dynamic range image based on the inverse tone mapped luminance values, wherein said plurality of luminance zones comprises at least three luminance zones, a low zone for luminances of low values, a high zone for luminances of high values, and a middle zone for luminances comprised between luminances of low values and luminances of high values, wherein said expansion exponent quadratic functions are defined by one set of three parameters a', b', c' and by the position of at least five expansion exponent control points such that:

said expansion exponent quadratic function determining expansion exponent values in middle zone passes through the second, third, fourth of these five expansion exponent control points, said expansion exponent quadratic function determining expansion exponent values in low zone passes through the first and second of these five expansion exponent control points, and said expansion exponent quadratic function determining expansion exponent values in high zone passes through the fourth and fifth of these five expansion exponent control points.

* * * * *